United States Patent
Black et al.

(10) Patent No.: US 11,205,982 B2
(45) Date of Patent: Dec. 21, 2021

(54) ACTUATOR MOTION CONTROLLER WITH REGENERATION COMPENSATION

(71) Applicant: LORD Corporation, Cary, NC (US)

(72) Inventors: Paul Black, Fuquay-Varina, NC (US); Douglas Swanson, Cary, NC (US); Russell E. Altieri, Holly Springs, NC (US)

(73) Assignee: LORD Corporation, Cary, NC (US)

( * ) Notice: Subject to any disclaimer, the term of this patent is extended or adjusted under 35 U.S.C. 154(b) by 717 days.

(21) Appl. No.: 15/758,833

(22) PCT Filed: Sep. 21, 2016

(86) PCT No.: PCT/US2016/052906
§ 371 (c)(1),
(2) Date: Mar. 9, 2018

(87) PCT Pub. No.: WO2017/053443
PCT Pub. Date: Mar. 30, 2017

(65) Prior Publication Data
US 2020/0228037 A1    Jul. 16, 2020

Related U.S. Application Data

(60) Provisional application No. 62/221,391, filed on Sep. 21, 2015.

(51) Int. Cl.
*H02P 21/00* (2016.01)
*H02P 101/30* (2015.01)
*H02P 101/45* (2016.01)

(52) U.S. Cl.
CPC ...... *H02P 21/0089* (2013.01); *H02P 2101/30* (2015.01); *H02P 2101/45* (2015.01)

(58) Field of Classification Search
CPC ...... H02P 3/14; H02P 3/16; H02P 3/26; H02P 21/36; H02P 3/18; H02P 21/00; H02P 21/0089
See application file for complete search history.

(56) References Cited

U.S. PATENT DOCUMENTS

| 5,814,954 A * | 9/1998 | Suzuki | H02H 5/047 |
| | | | 318/376 |
| 2009/0309523 A1* | 12/2009 | Ikei | H02P 3/12 |
| | | | 318/380 |

(Continued)

FOREIGN PATENT DOCUMENTS

| DE | 198 46 079 | 4/2000 |
| DE | 10 2010 021865 | 12/2011 |

(Continued)

OTHER PUBLICATIONS

International Search Report and Written Opinion for Application No. PCT/US2016/052906 dated Dec. 20, 2016.

(Continued)

*Primary Examiner* — Bickey Dhakal
(74) *Attorney, Agent, or Firm* — Jenkins, Wilson, Taylor & Hunt, P.A.

(57) ABSTRACT

Actuators are components of machines, which move and/or control a mechanism or system. During operation, actuators can experience regeneration events, with the actuator actually generating excess energy (e.g., regenerative energy) which must be stored or dissipated to avoid damaging the power supply. An actuator motor controller is configured to implement field oriented voltage control and flux weakening voltage control without current sensors. Dissipating regenerative energy includes providing a motor controller to command a motor drive to modify an input voltage, or to dissipate regenerative energy in a dump circuit. This command can cause motor windings to dissipate regenerative (Continued)

energy. Systems having a plurality of actuators distribute regenerative energy from one actuator to another. A central controller provides centralized regeneration dissipation control for the plurality of actuators. A power distribution unit includes a dump resistor to dissipate regenerative energy in addition to or instead of in the actuators.

36 Claims, 16 Drawing Sheets

(56) References Cited

U.S. PATENT DOCUMENTS

| | | | | |
|---|---|---|---|---|
| 2013/0154524 | A1* | 6/2013 | Kleinau | B60L 7/14 318/376 |
| 2014/0070751 | A1* | 3/2014 | Niwa | H02M 5/458 318/494 |
| 2014/0300298 | A1* | 10/2014 | Liu | H02P 3/22 318/380 |
| 2016/0126871 | A1* | 5/2016 | Uematsu | H02P 6/15 318/400.02 |
| 2018/0175766 | A1* | 6/2018 | Sakai | F25B 13/00 |

FOREIGN PATENT DOCUMENTS

| | | |
|---|---|---|
| WO | 2012/106616 | 8/2012 |
| WO | 2014/075030 | 5/2014 |

OTHER PUBLICATIONS

Akinin, K.P., Research of Braking Mode of Permanent Magnet Brushless Motors without Special Brake Devices, 2014 IEEE International Conference on Intelligent Energy and Power Systems, IEEE, Jun. 2, 2014, pp. 257-260.

European Office Action for Application No. 16785001.5 dated Jul. 1, 2020.

European Office Action for Application No. 16785001.5 dated Mar. 5, 2021.

* cited by examiner

ACTUATOR MOTION CONTROLLER WITH REGENERATION COMPENSATION

CROSS-REFERENCE TO RELATED APPLICATIONS

This application is a 371 application of International Application No. PCT/US16/52906 filed on Sep. 21, 2016, which claims the benefit of U.S. Provisional Patent Application No. 62/221,391, filed on Sep. 21, 2015, the disclosure of which is incorporated by reference herein.

TECHNICAL FIELD

The subject matter disclosed herein relates generally to the field of actuators and motor control, particularly in particular motor control during regeneration events, field oriented voltage control, and flux weakening voltage control. This includes, but is not limited to, Active Vibration Control Systems (AVCS) on helicopters or other vehicles or apparatuses. More particularly, the subject matter herein relates to improved methods and systems for handling motor regeneration, field oriented voltage control, and flux weakening voltage control.

BACKGROUND

Actuators are components of machines that are responsible for moving or controlling a mechanism or system, and provide control forces to a machine or structure. In some operating conditions, actuators can undergo such forces and/or vibrations, which result in energy being regenerated by the actuator. This energy must be distributed and/or dissipated in some manner, or otherwise a voltage supply will increase during such regeneration events. This increase in voltage supply can be of such a magnitude as to result in damage to electrical components. In many such instances, the power supply is not designed to handle significant current flowing back into it, such as occurs during a regeneration event. The conventionally accepted approach is to regulate regeneration current by dissipating any regenerative energy through a large dump resistor or sending it to an energy storage device. However, the size and weight penalty for such an energy storage or dissipation devices are prohibitive in certain applications where both weight and space are costly, such aerospace or automotive applications.

Furthermore, Field Oriented Control (FOC) using current feedback is known to those skilled in the art as a control method for a three phase (3-phase) motor. According to this methodology, a current feedback controller directly controls the torque-producing current ($i_q$) and drives the flux-producing current ($i_d$) to zero. As those skilled in the art know, there are numerous variants of this control method depending on the objectives and motor used, but until now, all known control methods use current sensor feedback.

In conditions where the three phase motors are operating at an upper end of their speed range and/or the bus voltage is lower than normal, the motors can enter an operating condition where there is insufficient bus voltage to maintain speed/torque control of the motors. To deal with this condition in a 3-phase motor, the motor designer may lower what would be considered an ideal flux linkage under normal conditions. This causes compromised or suboptimal performance in the normal speed and/or voltage range. Flux weakening is a control method known to those skilled in the art for dealing with such conditions. In flux or field weakening, some current is used to induce a field, which partially cancels the permanent magnet field. This flux weakening results in less torque per unit current, but also decreases the back electromotive force (back EMF) per unit speed, allowing the motor to be operated at higher speeds or with a lower bus voltage. Historically, this is done using motor current feedback to directly control the amount of flux weakening current ($i_d$) that is produced.

SUMMARY

In one aspect, an actuator is provided. The actuator comprises a motor controller, a motor drive, at least one motor winding, and at least one or more sensors. The motor drive is configured to receive power from a power source and to receive a command from the motor controller. The at least one motor winding is configured to receive a voltage from the motor drive. The at least one or more sensors being configured to detect a parameter associated with the actuator and communicate at least one signal containing information about the detected parameter to the motor controller. Wherein the motor controller is configured to process the at least one signal from the one or more sensors and provide control of the actuator.

In another aspect, a method of controlling an actuator using field oriented voltage control is provided. The method comprising the steps of providing at least one actuator, obtaining rotor position and/or speed from one or more sensors, estimating, from the rotor position and/or speed obtained, optimal direct and quadrature voltage values, and applying an electrical angle offset requested by a motor controller to increase an efficiency of a ratio of torque to power. The actuator comprises a motor controller, a motor drive, at least one motor winding, and at least one or more sensors. The motor drive is configured to receive power from a power source and to receive a command from the motor controller. The at least one motor winding configured to receive a voltage from the motor drive, the at least one motor winding positioned about a rotor. The at least one or more sensors being configured to detect a parameter associated with the actuator and communicate at least one signal containing information about the detected parameter to the motor controller. Wherein the motor controller is configured to process the at least one signal from the one or more sensors and provide control of the actuator.

In one aspect, a method of controlling an actuator using flux weakening voltage control is provided. The method comprising providing at least one actuator, monitoring a voltage phasor magnitude requested by the motor controller and a measured bus voltage, comparing the voltage phasor magnitude to the measured bus voltage, and applying, when the voltage phasor magnitude is greater than the measured bus voltage, a negative direct current to reduce a mutual flux linkage. The actuator comprises a motor controller, a motor drive, at least one motor winding, and at least one or more sensors. The motor drive is configured to receive power from a power source and to receive a command from the motor controller. The at least one motor winding is configured to receive a voltage from the motor drive. The at least one or more sensors being configured to detect a parameter associated with the actuator and communicate at least one signal containing information about the detected parameter to the motor controller. Wherein the motor controller is configured to process the at least one signal from the one or more sensors and provide control of the actuator.

In yet another aspect, a method of controlling regenerative energy is provided. The method comprising providing at least one actuator, detecting a regenerative condition, and dissipating the regenerative energy in the motor windings and/or a bus dump circuit. The actuator comprises a motor controller, a motor drive, at least one motor winding, and at least one or more sensors. The motor drive is configured to receive power from a power source and to receive a command from the motor controller. The at least one motor winding is configured to receive a voltage from the motor drive. The at least one or more sensors being configured to detect a parameter associated with the actuator and communicate at least one signal containing information about the detected parameter to the motor controller. Wherein the motor controller is configured to process the at least one signal from the one or more sensors and provide control of the actuator.

In still another aspect, a method of controlling an actuator is provided. The method comprising providing at least one actuator, obtaining rotor position and/or speed from one or more sensors, estimating, from the rotor position and/or speed obtained, optimal direct and quadrature voltage values, applying an electrical angle offset requested by a motor controller to increase an efficiency of a ratio of torque to power, monitoring a voltage phasor magnitude requested by the motor controller and a measured bus voltage, comparing the voltage phasor magnitude to the measured bus voltage, applying an electrical angle offset, when the voltage phasor magnitude is greater than the measured bus voltage, a negative direct current to reduce a mutual flux linkage, detecting a regenerative condition, and dissipating the regenerative energy in the motor windings and/or a bus dump circuit. The actuator comprises a motor controller, a motor drive, at least one motor winding, and at least one or more sensors. The motor drive is configured to receive power from a power source and to receive a command from the motor controller. The at least one motor winding configured to receive a voltage from the motor drive, the at least one motor winding positioned proximate to a rotor. The at least one or more sensors being configured to detect a parameter associated with the actuator and communicate at least one signal containing information about the detected parameter to the motor controller. Wherein the motor controller is configured to process the at least one signal from the one or more sensors and provide control of the actuator.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

An actuator is a component of machines responsible for moving or controlling a mechanism or system. In particular, actuators include, but are not limited to, rotary motor actuators and linear motor actuators. Many such actuators are capable of generating excess energy under certain operating conditions. For many applications where regenerative conditions can exist, the power supply is not designed to handle significant current flowing back into it. While operating in such regenerative conditions, the regenerative energy must be stored or dissipated to avoid damage to the power supply. The accepted conventional approach is to regulate regenerative energy by dumping it through a large shunt resistor or into an energy storage device. However, the size and weight penalty for such regenerative energy storage or dissipation devices are prohibitive in certain applications such as aerospace or automotive applications where both weight and space are at a premium and sought to be minimized.

Within this disclosure, reference is made to actuators, rotary motor actuators, linear motor actuators, force generators, circular force generators, linear force generators, etc. However, these examples are not intended to be limited thereto, and may include without limitation actuators for primary and secondary flight control surfaces, active struts, active rotor control for helicopters, piezoelectric actuators, hydraulic actuators, pneumatic actuators, etc.

Figure 1A:
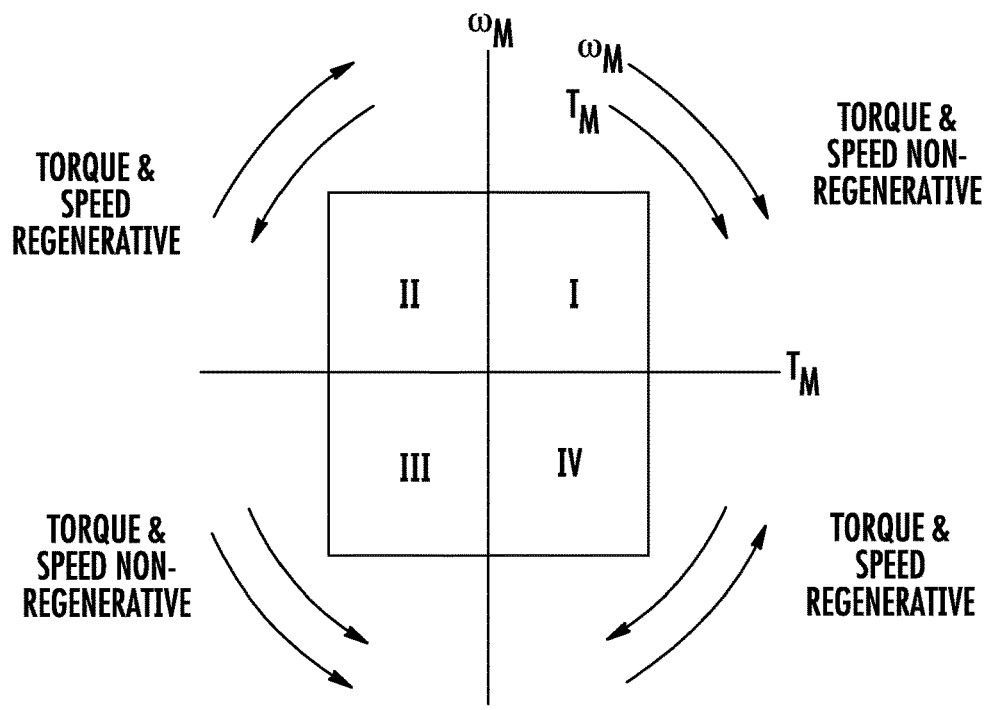
FIG. 1A is a schematic illustration of regeneration for rotary motion.
Figure 1B:
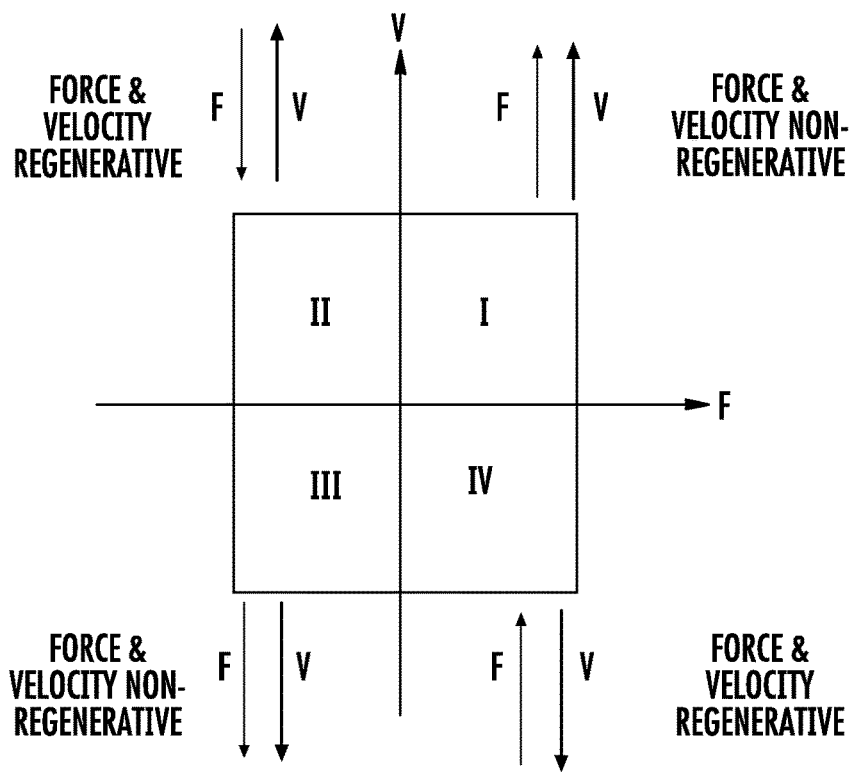
FIG. 1B is a schematic illustration of regeneration for linear motion.

The regeneration dissipation control (RDC) described herein provides a method of dissipating excess regenerative energy generated by an actuator. Referring to FIGS. 1A and 1B, the concept of regeneration for rotary and linear motion actuators is illustrated. Referring in particular to FIG. 1A for rotary motion, when torque ($T_M$) and speed ($\omega_M$) are moving in the same direction, as illustrated in quadrants I and III, energy is being consumed by the motor within the actuator to apply a positive torque to a rotating mass (not shown) the motor is attached to. Similarly, when torque ($T_M$) and speed ($\omega_M$) are oriented in opposite directions (e.g., negative torque is needed to maintain a commanded speed), energy is being generated; this is illustrated in quadrants II and IV where regenerative energy is being generated, referred to as the regenerative condition. Referring to FIG. 1B for linear motion, when force ($F_M$) and velocity ($V_M$) are moving in the same direction, as illustrated in quadrants I and III, energy is being consumed by the motor to apply a force to the oscillating mass the motor is attached to. Conversely, when force ($F_M$) and velocity ($V_M$) are moving in opposite directions, energy is being generated. This is illustrated in quadrants II and IV. Steady operation in the regeneration quadrants II and IV will occur when the magnitude of the regenerative energy is greater the mechanical and electrical losses. When this happens, the regenerative energy may flow back to the power supply, be consumed by a connected non-regenerative actuator or dumped. Preferably, the regenerative energy is prevented from flowing back to the power supply and is either stored or dissipated.

Figure 2A:
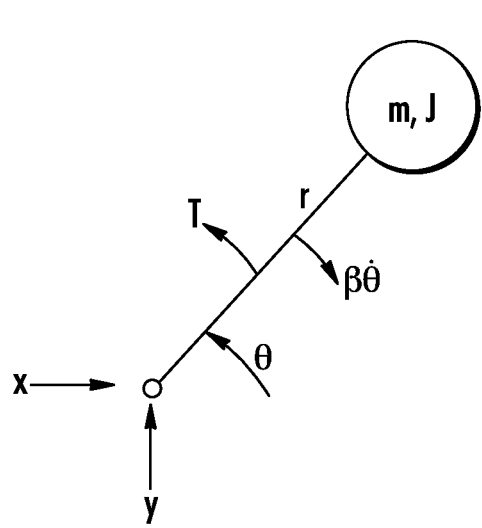
FIG. 2A is a schematic illustration of a dynamic model of a rotary motor actuator mounted on a moving structure.
Figure 2B:
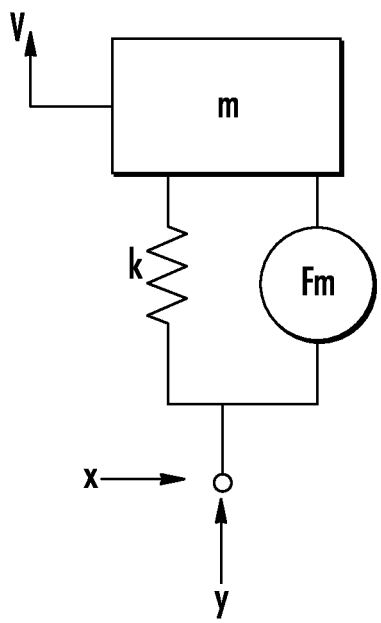
FIG. 2B is a schematic illustration of a dynamic model of a linear motor actuator mounted on a moving structure.

Referring to FIGS. 2A and 2B, dynamic models of a rotary motor actuator and a linear motor actuator mounted on a spring mass system, respectively, are illustrated. FIGS. 2A and 2B are non-limiting schematic representative examples of actuator systems suitable for application of RDC. FIG. 2A schematically illustrates a rotary actuator with at least one rotating mass (m) with polar moment of inertia (J), at least two motions in the plane of rotation (X and Y), at least one angle of rotation ($\theta$), a motor torque (T) and damping torque ($\beta\dot\theta$). FIG. 2B schematically illustrates a linear motor actuator with least one linear actuator mass (m), a spring rate (k), motor force ($F_m$), a displacement of the mass (v), and a displacement of the base structure (y).

The torque of the rotary motor actuator illustrated in FIG. 2A is characterized by equation (1):

$$T = J\ddot\theta + \beta\dot\theta + mr(\ddot Y \cos\theta - \ddot X \sin\theta) \quad (1)$$

where motor torque (T) is equal to the polar moment of inertia (J) of the rotating mass times the angular acceleration ($\ddot\theta$) plus the damping ($\beta$) times angular velocity ($\dot\theta$) plus the mass (m) times the radius (r) times the difference of the value between acceleration ($\ddot Y$) in the Y direction times the cosine of angle of rotation ($\theta$) minus the acceleration ($\ddot X$) in the X direction times the sine of the angle of rotation ($\theta$). The regeneration is characterized when the vibration torque ($mr(\ddot Y \cos\theta - \ddot X \sin\theta)$) is negative (relative to the direction of rotation) and larger than the damping torque ($J\ddot\theta + \beta\dot\theta$). In this condition, the motors will generate reverse current, which is called regeneration. This is captured in equation (2):

$$mr(\ddot Y \cos\theta - \ddot X \sin\theta) < -(J\ddot\theta + \beta\dot\theta) \quad (2)$$

The regeneration of the energy from the linear motor actuator illustrated in FIG. 2B is characterized by equation (3):

$$Fm = -Kv - m\ddot v + Ky \quad (3)$$

where motor force (Fm) is equal to the negative spring rate times the v displacement minus the mass times the acceleration plus the spring rate times the y displacement.

Figure 3:
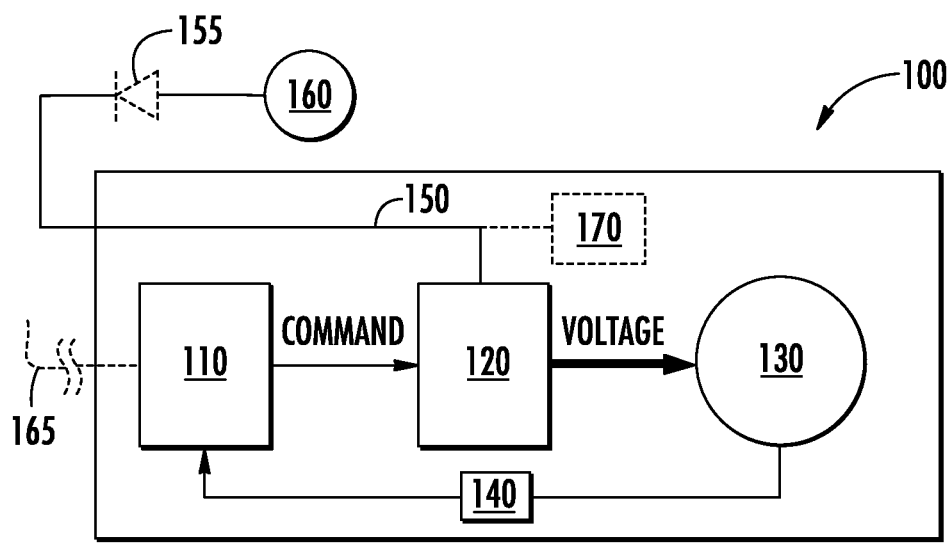
FIG. 3 is a schematic illustration of an actuator system according to an embodiment of this invention.

Generally referring to FIG. 3, and as discussed above, in many applications, the power supply is not designed to handle significant current flowing back into it. The accepted approach in this field is to regulate regenerative energy by dumping regenerative energy through a dump (shunt) resistor or to an energy storage device. However, the size and weight penalty for such energy storage or dissipation devices are prohibitive in certain applications, such as aerospace or automotive where both weight and space are costly.

The RDC method provides an alternate means of regeneration dissipation through the one or more motor windings of an actuator. This invention can be used with or without a dump circuit configured to dissipate regenerative energy. In some cases, a small dump circuit may be desirable to dissipate fast transients. An addition benefit to this approach is that such actuators are typically well heat sunk to any supporting mechanical frame and therefore provide well-suited thermal conduction path for dissipating heat away from the temperature sensitive electronic components.

The RDC method provides an alternative method of regeneration dissipation through one or more actuators, which are electrically connected together. The RDC can be integrated into a motor controller either with or without a regeneration dump circuit. In some embodiments, a regeneration dump circuit, preferably a small regeneration dump circuit, may be implemented to dissipate fast regeneration transient events.

The RDC dissipates regenerative energy within motor windings of one or more actuators. In such an instance, excess power is being dissipated, with the motor windings acting as resistors, which are thermally coupled to a motor structure for heat dissipation. As such, the motor windings act as resistors operating in a substantially analogous manner to the dump resistor. This dissipation of additional regenerative energy in the motor windings reduces or eliminates any excess regenerative energy that a dump resistor would be required to dissipate in embodiments known in the prior art.

The RDC can be divided into two different categories of applications: synchronous and asynchronous.

Asynchronous RDC can be accomplished by adding a secondary asynchronous signal to the desired control signal. This asynchronous RDC signal is selected so that it has minimal effect on the critical actuator functions. Some examples of asynchronous RDC commands are random, shaped random, DC offset, or a sinusoidal command at a frequency away from the control range.

Figure 4A:
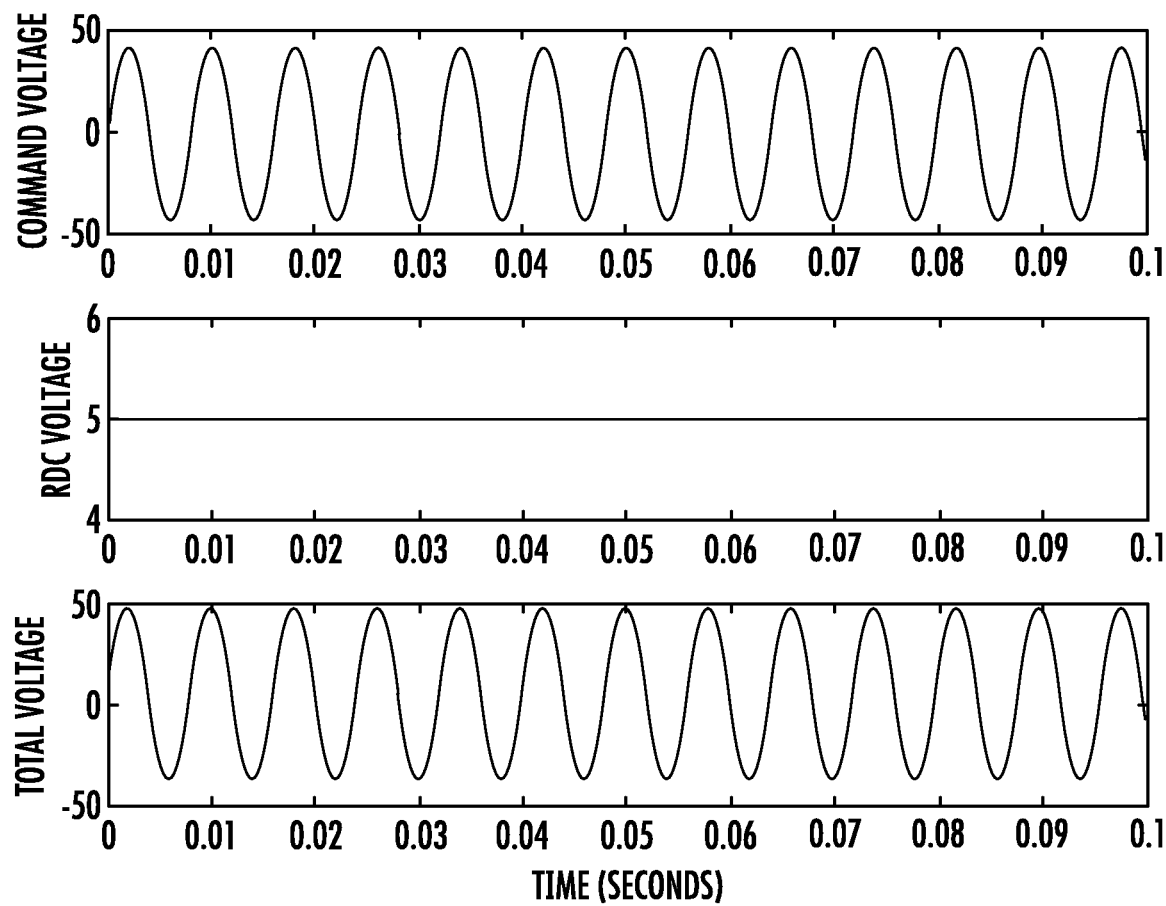
FIG. 4A is a graphical representation of an asynchronous RDC command added to the actuator command (motor drive input voltage).

An example of this is seen in FIG. 4A, where a 5 Volt (V) RDC offset signal is shown to be added to a sinusoidal 45 V actuator command. In this case, the RDC increases the power losses in the motor windings without affecting the dynamic performance of the actuator. This act of dissipating additional energy in the motor windings 130 reduces or eliminates any regenerative energy the dump circuit needs to dissipate.

Figure 5:
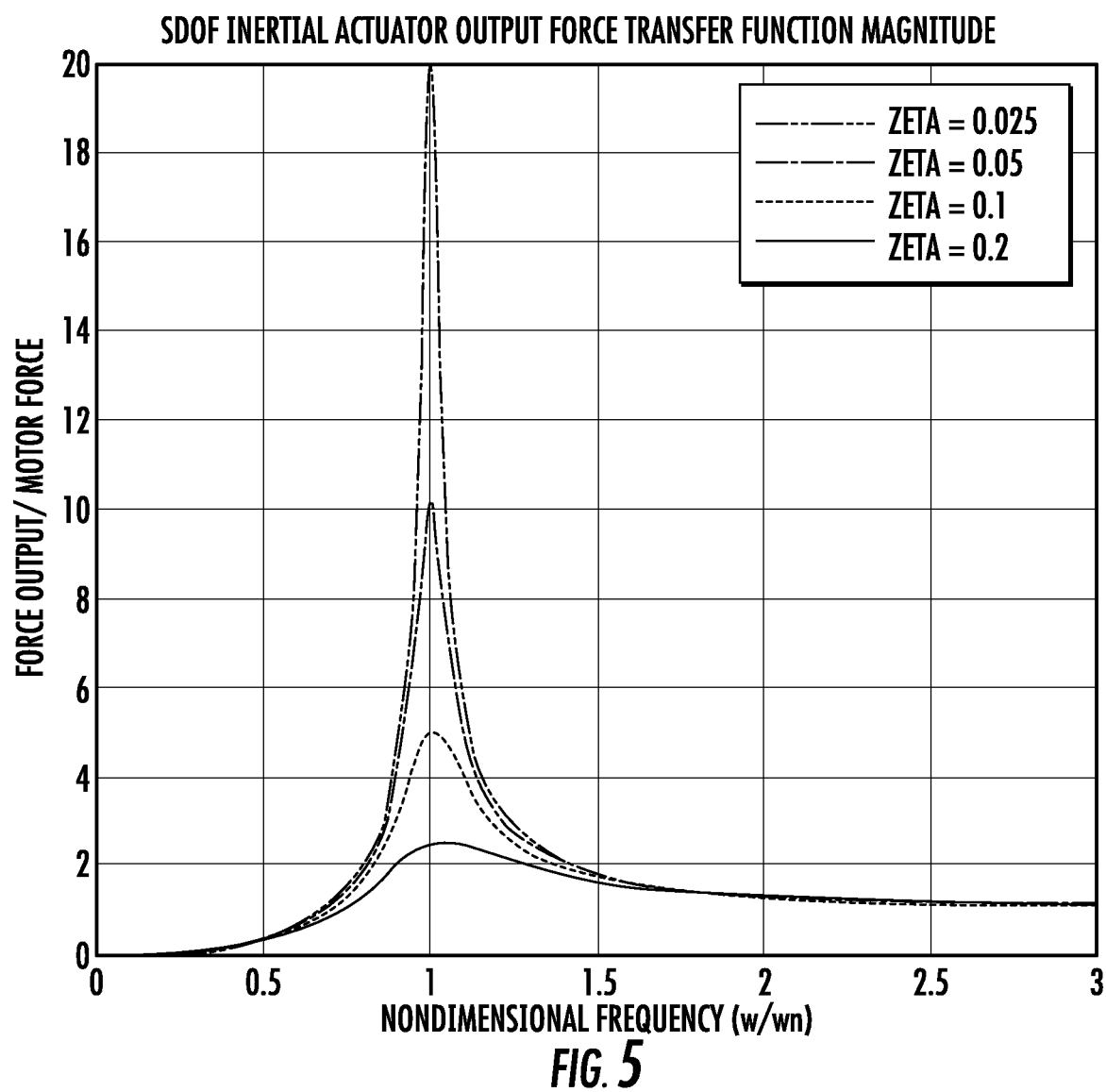
FIG. 5 is a graphical representation of a resonant inertial mass actuator (e.g., linear motor actuator) and the transfer function of transmitted force output to motor force input.

Such an asynchronous RDC signal can be successfully employed on a resonant inertial actuator (e.g., a mass mounted on a spring with a resonant frequency close to the control frequency as shown in FIG. 2B). FIG. 5 illustrates the force output to force input transfer function of a resonant inertial linear motor actuator. As can be seen from FIG. 5, a command signal below 25% of the resonance frequency transmits almost zero (0) output force.

Figure 6:
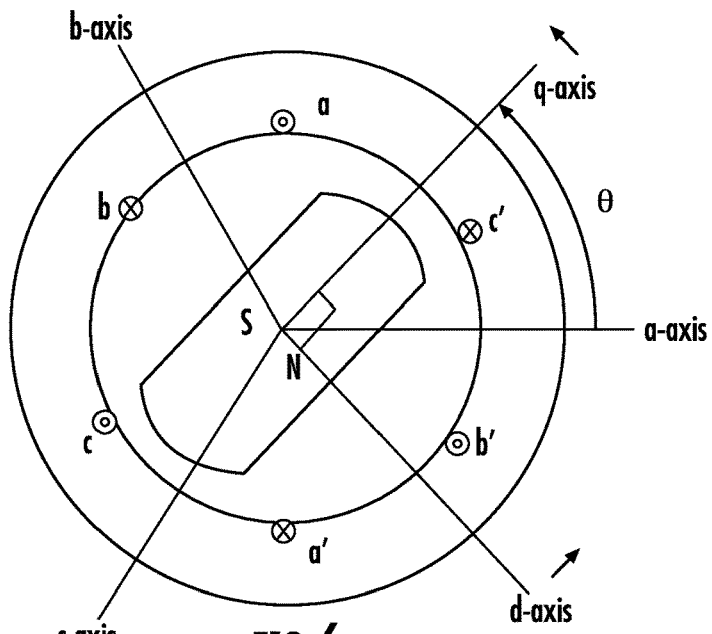
FIG. 6 is a prior art illustration of a simplified 3-phase Permanent Magnet Synchronous Motors (PMSMs).

A different RDC approach may be used for synchronous motors such as a Permanent Magnet Synchronous Motors (PMSMs). PMSMs most commonly have 3 phases. However, a 3-phase synchronous AC motor can be simplified to an equivalent two-phase (2-phase) DC motor using the rotating rotor reference frame transformation. This is done by replacing the stator windings with a fictitious stator winding on the q- and d-rotating axes as illustrated in FIG. 6.

The rotor reference frame transformation is shown in the equation 4 below.

$$\begin{bmatrix} S_q \\ S_d \\ S_o \end{bmatrix} = \frac{2}{3} \begin{bmatrix} \cos(\theta_e) & \cos(\theta_e - 2j\pi/3) & \cos(\theta_e + 2\pi/3) \\ \sin(\theta_e) & \sin(\theta_e - 2\pi/3) & \sin(\theta_e + 2\pi/3) \\ 1/2 & 1/2 & 1/2 \end{bmatrix} \begin{bmatrix} S_a \\ S_b \\ S_c \end{bmatrix}. \quad (4)$$

where S represents the transformed variable (voltage, current, or flux linkage), $\theta_e$ represents the electrical angle between the a-axis and q-axis, $i_O$ represents the zero sequence. If the phases are balanced or the stator is electrically floating, the zero sequence term (So) will be zero.

Figure 7:
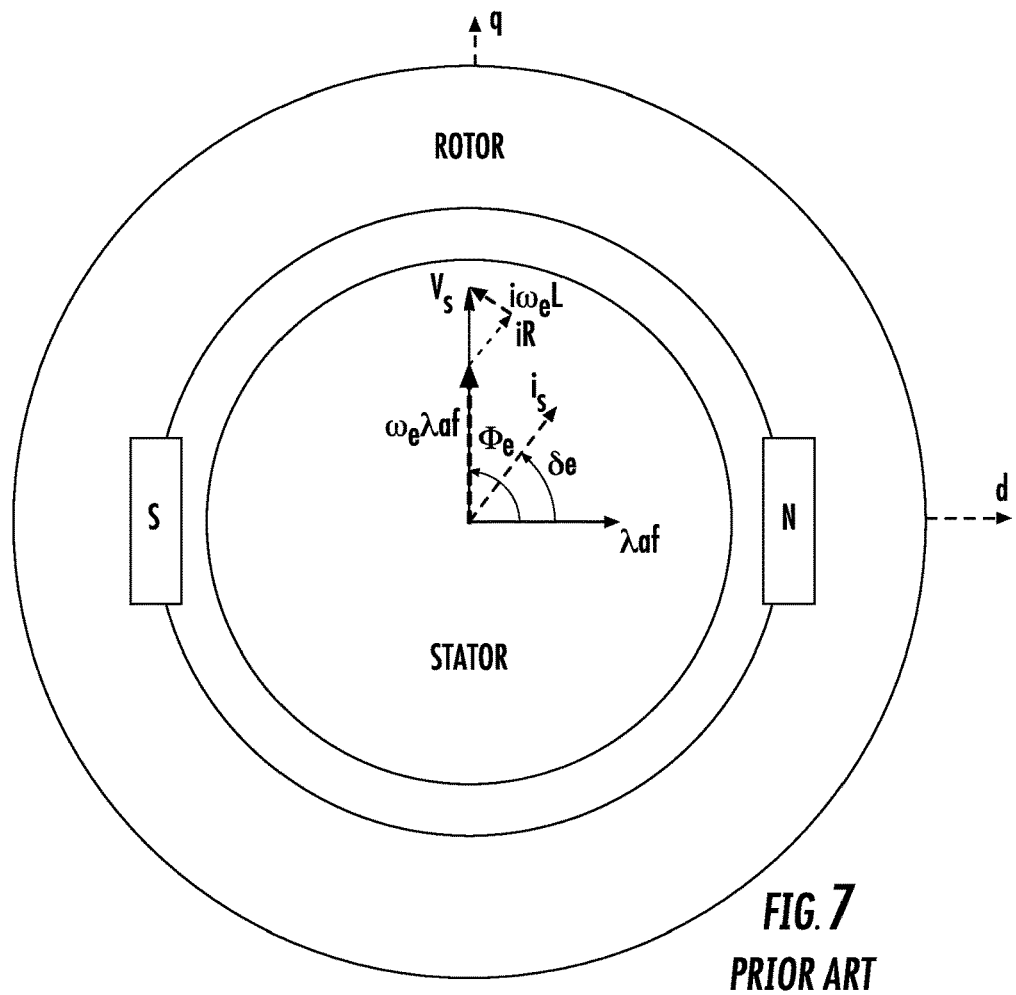
FIG. 7 is a prior art illustration of a rotor reference frame voltage, current, and flux linkage phasors.

The dq voltage, current, and flux linkage can be expressed as resultant vectors as depicted in FIG. 7 and the equation below. The flux caused by the permanent magnets will always align with the d-axis and the back EMF always lines up with the q-axis. The voltage and current phasor are shown with their electrical angles measured with respect to the –d axis, $$V_d = V_s \cos(\phi_e) \quad i_d = i_s \cos(\delta_e)$$

$$V_q = V_s \sin(\delta_e), \quad i_q = i_s \sin(\delta_e) \quad (5)$$

where V is voltage phasor, $\Phi_e$ is the voltage electrical offset angle, i is current, and $\delta_e$ is the current electrical angle offset.

Power for balanced PMSMs, is shown in the equation below, $$P = \tfrac{3}{2}[V_q i_q + V_d i_d]. \quad (6)$$

The quadrature power is shown from the first term in the equation above and is responsible for producing useful mechanical torque or force. The direct term (second term) effects the mutual magnetic flux but does not produce any mechanical torque or force.

RDC is implemented on PMSMs by increasing the direct power when needed. This can be done by modifying the electrical angle. For minimal power consumption, an electrical angle ($\phi_e$) should be 90 deg. Increasing this angle increases the direct current ($i_d$) independently of the torque or quadrature current ($i_q$). For this approach, the motor controller increases the power losses in the motor windings without affecting the mechanical power being generated by the motor. The direct current is shown below as a function of the electrical angle ($\phi_e$).

$$i_d = \frac{\left[\left(R_s \frac{4T_{cmd}}{3P\lambda_{af}} + \frac{P\omega_{cmd}\lambda_{af}}{2}\right)\cot(\phi_e) + \frac{2\omega_{cmd}L_q T_{cmd}}{3\lambda_{af}}\right]}{R_s\left(1 - \frac{P\omega_{cmd}L_d}{2R_s}\right)}. \quad (7)$$

where R is the phase resistance, T is the torque command, P is the number of magnetic poles, $\omega_{cmd}$ is the mechanical angular velocity, $L_q$ is quadrature inductance, and $\lambda_{af}$ is rotor flux linkage.

Regeneration can be detected in one of several ways, including, for example, by monitoring the bus voltage, dump resistor current or temperature, or regeneration power or current. When the bus voltage is monitored, the bus voltage will increase when regeneration occurs. Similarly, the bus dump current or temperature will increase when regeneration occurs. Monitoring bus power or current will result in a negative value (flowing away from the motor) when regeneration is occurring. The negative value is referred to as regeneration power or current. These different detections methods are referred to as the RDC input in FIG. 4B.

Figure 4B:
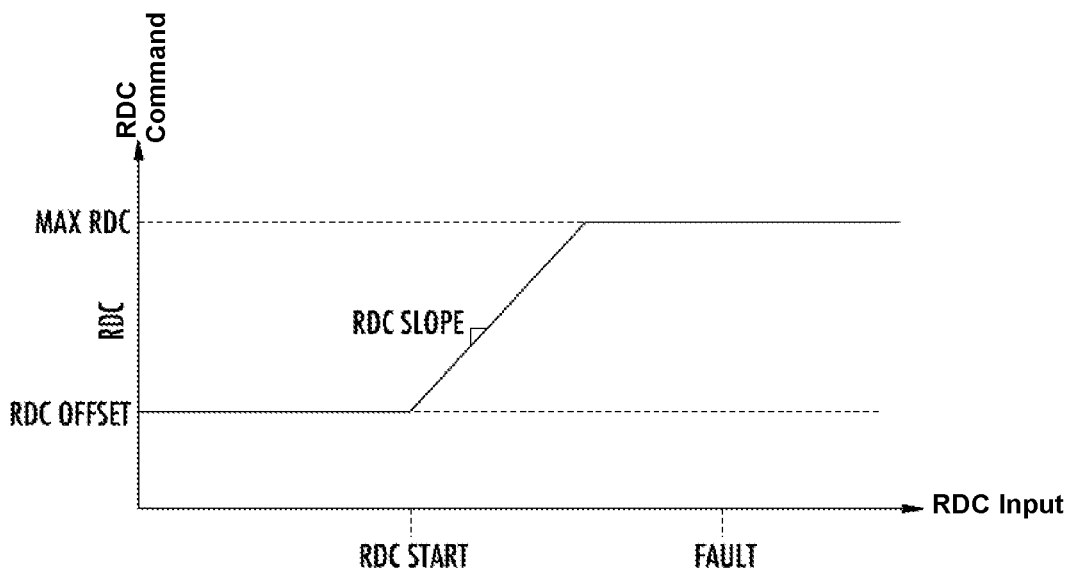
FIG. 4B is a graphical representation of the RDC method.

Referring to FIG. 4B, the plot illustrated depicts the case where the RDC command is modified based on the RDC input. RDC command referred hereinafter includes the electrical angle offset and/or the amplitude of the RDC signal, singly or jointly. In the example illustrated in FIG. 4B, once the RDC input reaches the RDC start value, the RDC command (amplitude or angle) increases proportionally to the RDC input until it reaches its max RDC value. The maximum value is dictated by the thermal and current limits of the motor and drive. The RDC slope (rate of change) for the RDC command can be empirically determined or calculated based on the electrical and thermal resistance of the bus dump circuit 170.

Referring to FIGS. 3 and 4B, in one embodiment of this invention, the motor controller 110 measures and/or predicts the temperature of its bus dump circuit 170 and modifies the RDC command based on the bus dump circuit 170 temperature. In the case of an asynchronous actuator, the amplitude of the RDC signal is modified based on the temperature. In the case of the synchronous actuator, the electrical angle offset is modified based on the temperature of the bus dump circuit 170, as illustrated in FIG. 4B. In another embodiment, the RDC schedules the RDC command based on measured/predicted current or power.

Figure 8:
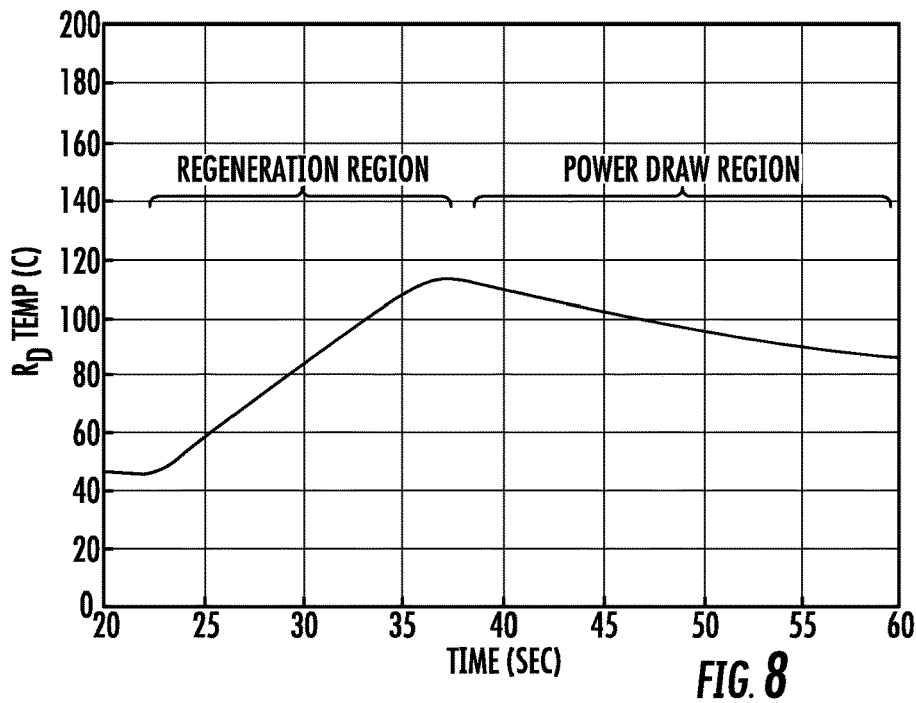
FIG. 8 illustrates an exemplary plot of a dump resistor temperature rise during a regeneration event.

Referring to FIG. 8, it is illustrated how the bus dump circuit 170 temperature rises during a moderate regeneration event when the RDC is disabled. With the rapid temperature rise of the bus dump circuit 170 shown in FIG. 8, it can be seen that continuous regeneration without the RDC being enabled could damage the dump circuitry.

Figure 9:
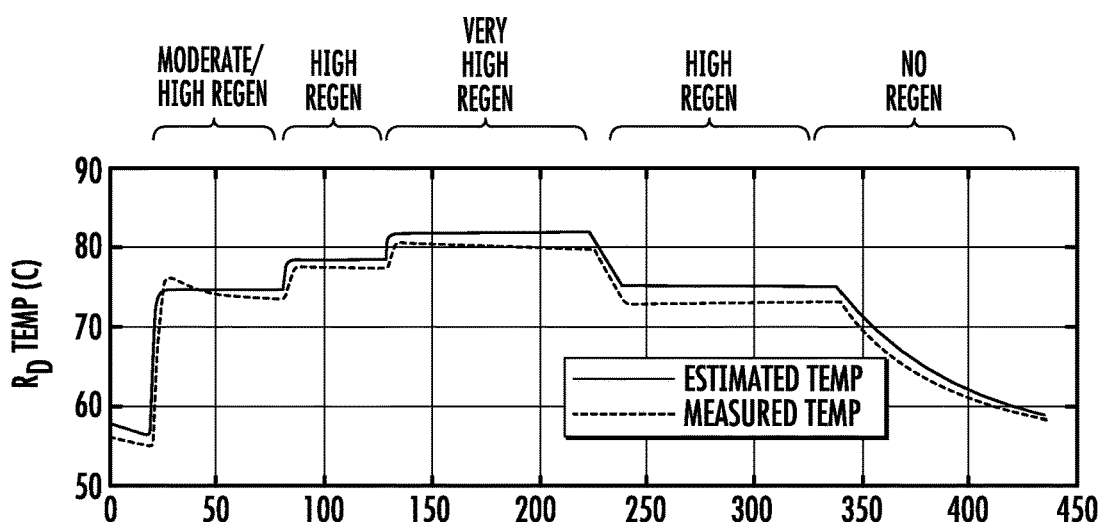
FIG. 9 illustrates an exemplary dump resistor temperature with the RDC enabled on an example first plot and an electrical angle offset on an example second plot.
Figure 9:
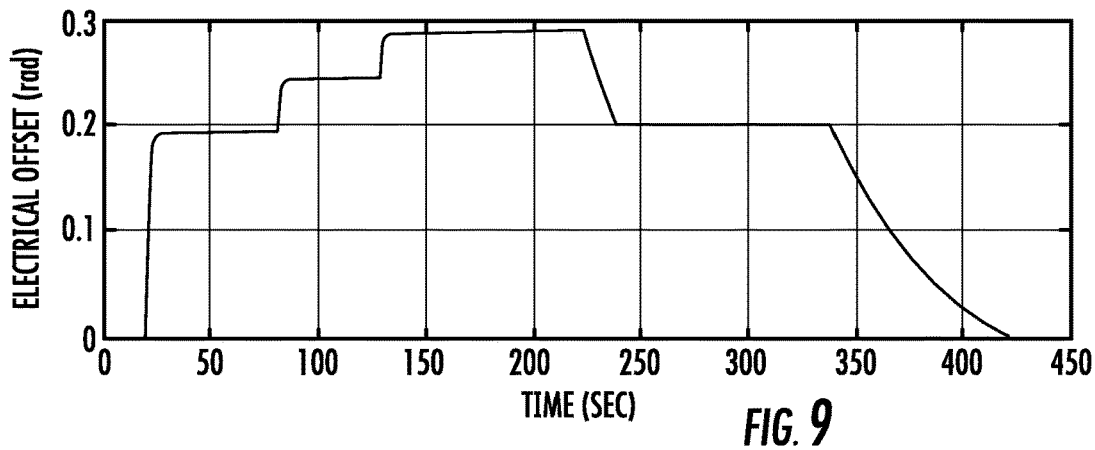

FIG. 9 shows the bus dump circuit 170 temperature with the RDC enabled for an example synchronous actuator. In this case, it also shows how an RDC command (e.g., an electrical angle offset) changes with various regeneration intensity levels. It can be seen from the example illustrated in FIG. 9 that as the regeneration energy increases and decreases, the electrical angle offset quickly adjusts to achieve a new thermal equilibrium point for the bus dump circuit 170. With the addition of this feature, the same bus dump circuit 170 shown in FIG. 8 can now handle high levels of regeneration without overheating the dump circuitry.

In one embodiment, the RDC simply adds a RDC command that remains present during all phases of operation. In this way, the motor controller is burning additional energy in the actuator under normal power draw and regeneration conditions. This can be implemented as a simple offset in the software. The approach is particularly useful when a small amount of regeneration energy needs to be dissipated.

Figure 16:
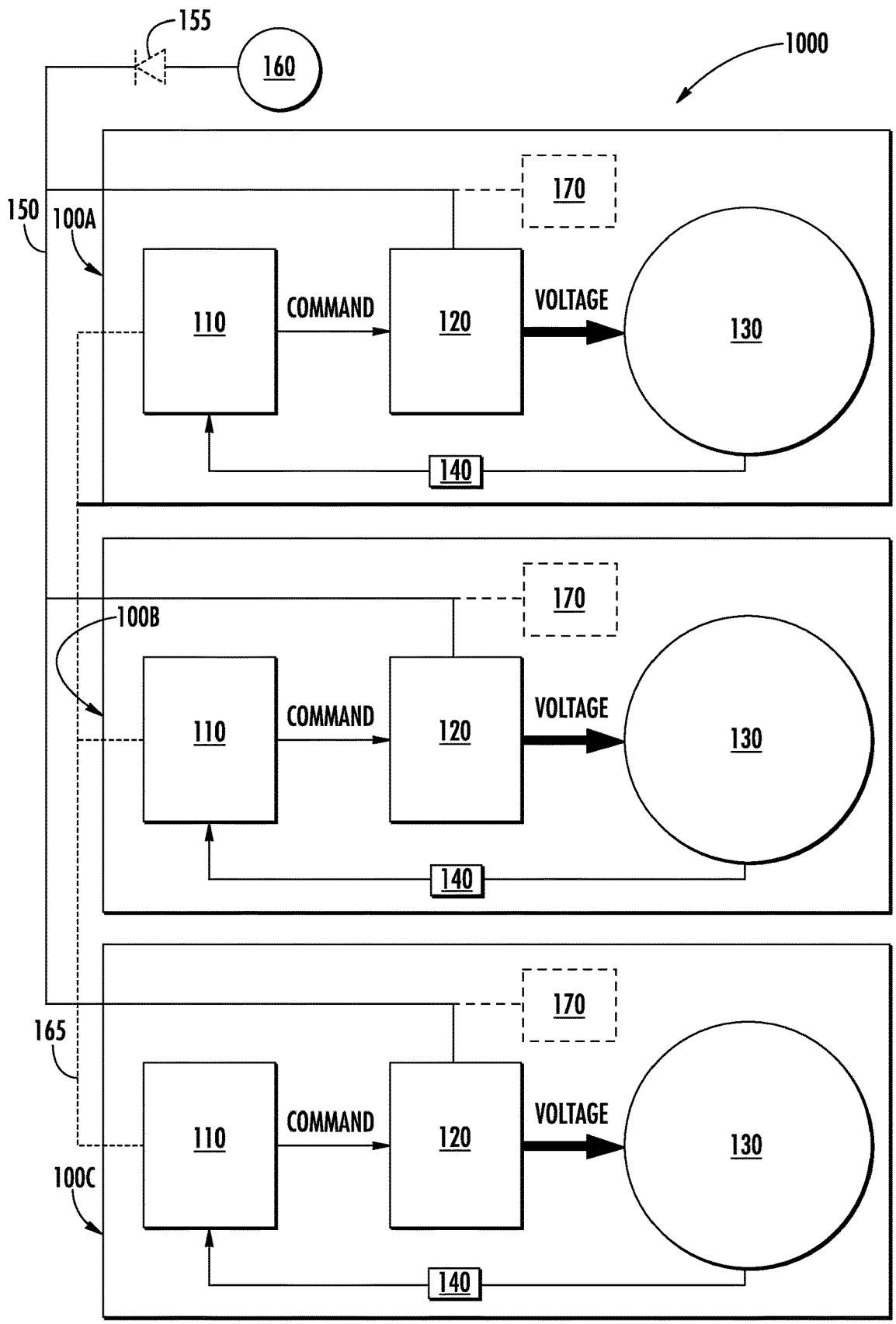
FIG. 16 is a schematic illustration of an exemplary actuator control system according to an embodiment of this invention.

Referring back to FIG. 3 and to FIGS. 16-19 an actuator system 100 (e.g., a rotary or linear motor actuator) with integrated power and drive electronics and an optional dump resistor and/or energy storage device (e.g., a capacitor) is illustrated. The optional dump resistor and/or energy storage device are collectively referred to as bus dump circuit 170. Actuator system 100 is referred to hereinafter as actuator 100. The actuator 100 includes motor controller 110, motor drive 120, at least one winding 130, at least one sensor 140 and power source 160. As illustrated, motor drive 120 is in electrical communication with power bus 150. However, power bus 150 is representative of any form of electrical power communication to motor drive 120, including power buses, Ethernet, AC/DC wiring, wireless electrical transmission, etc. collectively referred to hereinafter as power bus 150. In some embodiments, an optional (i.e., a dump resistor and/or an energy storage device) is included. Actuator 100 is configured to dissipate (burn) the regenerated energy in motor windings 130 and/or in bus dump circuit 170. Furthermore, optional diode 155 is illustrated in FIGS. 3 and 16 is positioned between motor drive 120 and power source 160. Diode 155 may be a rectifier, as known to those skilled in the art. Diode 155 is configured to prevent regenerative energy from returning to the power source.

Motor controllers 110 and motor drives 120 are not necessarily positioned within actuator 100. Instead, they may be positioned externally together or separately.

Additionally, FIG. 3 includes optional data communications line 165 from an external source (not shown) configured to provide a command signal for actuator 100. Data communications line 165 may be wired, wireless, analog, digital, etc. However, actuator 100 can be configured to determine on its own the action necessary to command itself and/or dissipate regenerated energy.

As illustrated in FIG. 3, motor controller 110 is configured to send a command to the motor drive 120. Based upon the received command, motor drive 120 sends a voltage to the at least one motor winding 130, which are configured to receive the voltage. The at least one sensor 140 is configured to send or otherwise make available at least one signal to motor controller 110 indicating a parameter associated with the at least one motor winding 130. For example, the at least one sensor 140 may include one or more of a Hall effect sensor, an encoder or resolver configured to measure phase position and speed, a motor temperature sensors, a motor voltage sensor, a motor current sensor, a bus voltage sensor, a bus current sensor, and a bus dump resistor sensor, and combinations thereof. Where the actuator 100 is a linear motor actuator, only voltage and current are typically implemented as motor sensors.

For a rotary motor actuator, RDC dissipates regenerative energy by changing the electrical angle and thereby increasing the magnitude of the flux current ($i_d$) flowing through the motor without affecting the torque producing current ($i_q$). Therefore, the controller increases the power losses in one or more the motor windings without affecting the mechanical power provided to the rotor. This act of dissipating additional energy in the one or more motor windings, reduces or eliminates the regenerative energy that a dump resistor needs to dissipate.

As was described above, when a torque needed to maintain a commanded speed is negative, relative to the rotational speed of the actuator, the actuator will generate reverse current (e.g., undergo a regeneration event). If the regeneration event is of a sufficient severity so as to produce more regenerative energy than is required to overcome any mechanical and electrical losses associated with operating the actuator, then regenerative energy, left unchecked, will flow back to the power supply. This regenerative energy back flowing can be detected in many ways, examples of which involve current monitoring at discrete points on power bus 150 and voltage monitoring of power bus. During a regeneration event in which regenerative energy exceeds the energy demands from one or more other actuators connected to power bus 150, the voltage of power bus 150 will begin to rise. By implementing voltage monitoring and/or current monitoring on power bus 150, motor controller 110 is thereby configured to detect a regeneration event while still maintaining control of actuator 100. By using optional diode 155, any regenerative energy on power bus 150 is prevented from entering and damaging power source 165.

FIG. 3 shows an example embodiment of such an actuator 100, including the optional bus dump circuit 170. In this embodiment, the power bus 150 is illustrated as being connected to an external power source 160. In some example embodiments, actuator 100 is a rotary motor actuator and linear motor actuator. It should be noted that the method of actuator control for regeneration energy is not limited to these embodiments, and is applicable to any actuator which is capable of creating regenerative energy during normal operation.

Employing the process described above, when using the optional bus dump circuit 170, actuator 100 is configured to dissipate regenerative energy from motor windings 130. In such embodiments, controller 110 may be configured to measure or estimate a temperature of bus dump circuit 170 and to issue a command to motor drive 120. For example, where actuator 100 is a rotary motor actuator, the command may contain an instruction for modifying the RDC command to motor drive 120 to either increase or decrease the electrical angle offset or the amplitude of the RDC signal. In other embodiments, the relationship between the RDC command applied and the temperature of the bus dump circuit 170 is proportional, at least between a minimum and a maximum allowable value of the RDC command, as discussed hereinabove. In other embodiments, motor controller 110 is configured to command motor drive to apply a static value for the RDC command that is persistent during all phases of operation.

In embodiments where actuator 100 is a linear motor actuator, the command from motor controller 110 may contain a signal, which does not significantly alter the performance of the actuator. As described above with respect to an example embodiment in a rotary motor actuator, controller 110 may be configured to measure or estimate a temperature of bus dump circuit 170 and the RDC command issued by controller 110 may correspond to the temperature of bus dump circuit 170.

In some embodiments, motor controller 110 is modular and configurable so that each control methodology can be deemphasized or turned off as needed.

According to another aspect, an actuator control system 1000 is provided, as is shown in the example embodiments illustrated in FIGS. 16-19. In some embodiments, actuator control system 1000 comprises a plurality of actuators 100A, 100B, and 100C. In the embodiment of FIG. 16, it is shown that three actuators 100A, 100B, and 100C are connected to a power source 160 by a common power bus 150. According to this embodiment, actuators 100A, 100B, and 100C are each configured as the embodiment of actuator 100 shown in FIG. 3. Motor controllers 110 are all illustrated as having a data communications line 165 configured to provide shared data regarding each actuator (e.g., motor current, motor voltage, temperature, current, bus voltage, linear or rotary motion, command signals to the actuator, RDC commands, diagnostic and health information, etc.).

Referring to FIG. 16, actuator control system 1000 is configured to dissipate regenerative energy from one or more of the motor actuators 100 by sending a command to its respective motor drive 120 to apply an RDC command to the actuator. However, in such situations where a plurality of actuators 100A, 100B, and 100C are connected on a common power bus 150, any energy regenerated by any single actuator (e.g., 100A) will backflow along common power bus 150 to be distributed to and consumed by others of the plurality of actuators (e.g., 100B and 100C). In the case where energy is regenerated by actuators 100A, 100B, and 100C, the energy required to be input from power source 160 is reduced during any regeneration event. Given the regenerative energy redistribution capabilities of actuator control system 1000, regenerative energy may only need to be dissipated when the amount of regenerative energy produced within actuator control system 1000 exceeds the power consumption requirements of all non-regenerating actuators. In such situations, the voltage of common power bus 150 will increase as discussed above in reference to FIG. 3. In some instances, it may be preferred to redistribute any regenerative energy from an actuator regenerating energy (e.g., 100B) to other non-regenerating actuators (e.g., 100A and 100C). In other instances, enough regenerative energy may be created to create a voltage surplus on common power bus 150. In one embodiment, optional diode 155 may be positioned to prevent energy flow back into common power source 160.

In some embodiments, motor controller 110 is configured to detect the voltage of common power bus 150 and to command motor drive 150 to apply an RDC command only when the voltage of common power bus 150 is greater than a manufacturer defined minimum threshold value to prevent damage of the subcomponents of actuators 100A-100C. Through data communications line 165, motor controllers 110 share information to command dissipation of energy in motor windings 130 or optional bus dump circuit 170. Optional bus dump circuit 170 is configured to provide additional capabilities for dissipating regenerative energy, specifically by each actuator 100A, 100B, and 100C being capable of dissipating regenerative energy within bus dump circuit 170 in addition to or instead of in motor windings 130.

Figure 17:
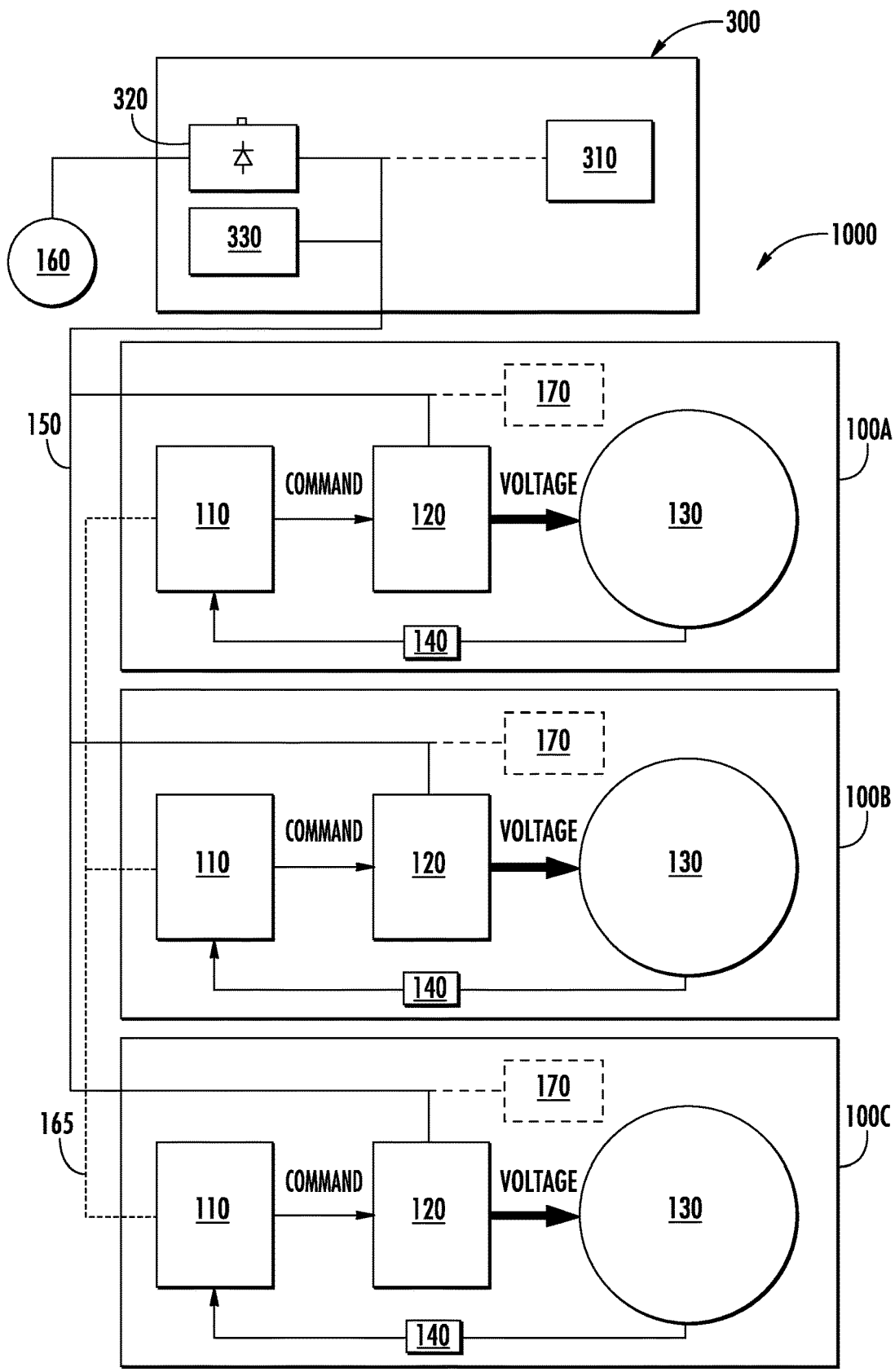
FIG. 17 is a schematic illustration of an exemplary control system with multiple actuators according to an embodiment of this invention.

FIG. 17 shows another embodiment of actuator control system 1000. Actuator control system 1000 of FIG. 17 includes all features of the embodiment illustrated in FIG. 16 and discussed above, but also includes a power distribution unit (PDU) 300 in electrical communication with common power bus 150 and further configured to provide power to actuators 100A, 100B, and 100C. PDU 300 includes a power rectification module 320, such as AC to DC rectification module 320, a dump resistor 310, and a capacitor bank 330. Power rectification module 320 is configured to be connected to power source 160. Power rectification module 320 performs the same function as optional diode 155 illustrated in FIG. 16. According to this embodiment, during a regeneration event where actuators 100A, 100B, and 100C are producing a net positive amount of energy, the excess regenerative energy can also be dissipated within bus dump circuits 170 and motor windings 130 of actuators 100A, 100B, and 100C, and/or by dump resistor 310 of PDU 300. This further allows for the dump resistor 310 and the discrete bus dump circuits 170 to be designed to accommodate lower regenerative energy dissipation levels.

Figure 18:
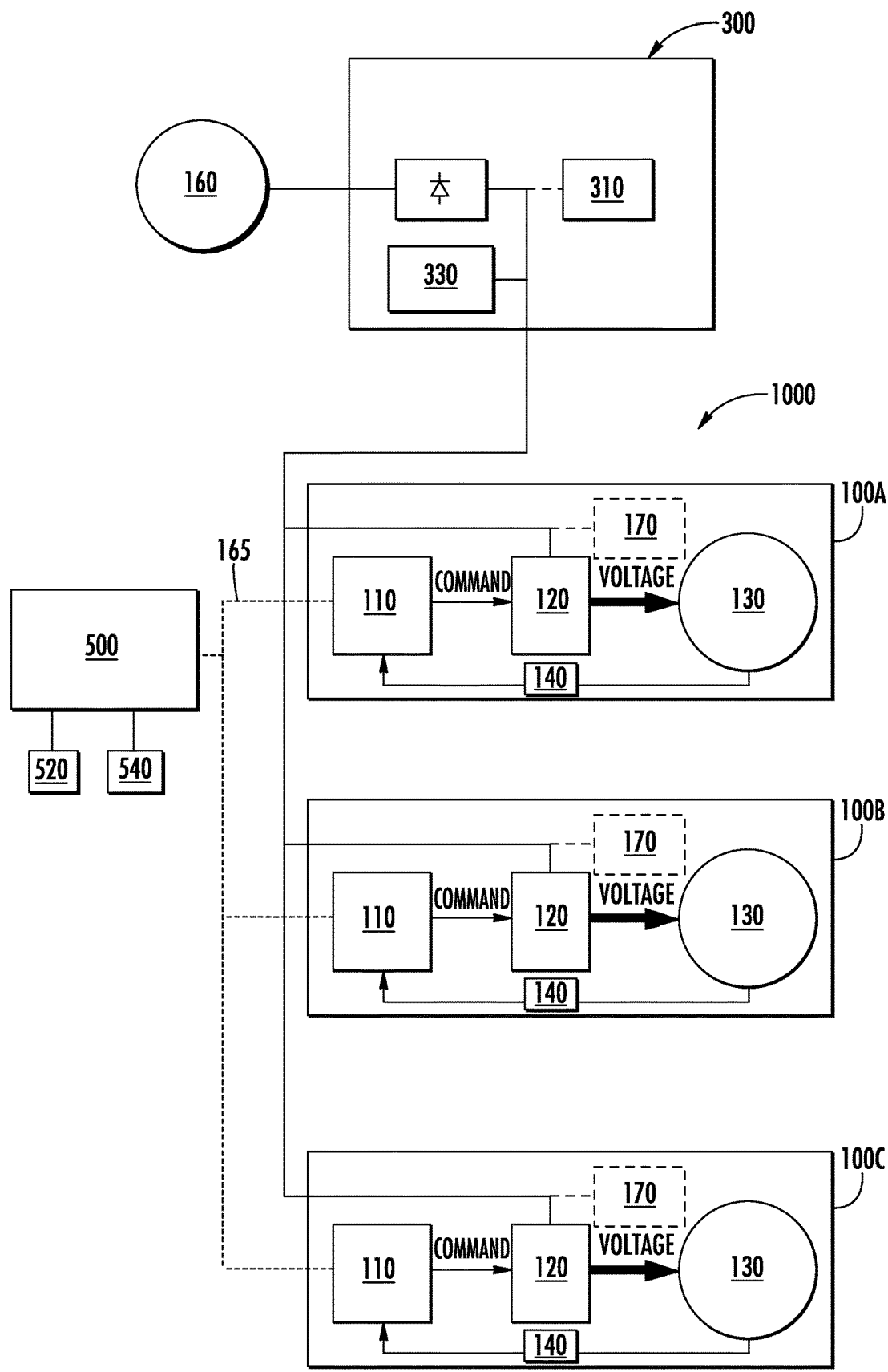
FIG. 18 is a schematic illustration of an exemplary control system with multiple actuators according to an embodiment of this invention.

Referring to FIGS. 16-18, applications where multiple actuators are connected to a central power distribution unit (PDU), it may be necessary to measure or approximate the total regenerative energy in order for a proper implementation of RDC. Actuator control system 1000 also includes distributed motor controllers 110 connected to a common power source 160, power bus 150, and data communications line 165. Each motor controller 110 is capable of measuring its net current draw and regeneration on the common power bus 150. The net current of each distributed motor controller 110 is regularly updated on the data communication line 165. In this way, each motor controller 110 is configured to share its own information as well as receive information all other motor controllers 110. Since the power to each motor controller 110 is supplied from a common power bus 150, the voltage at each motor controller 110 is nominally the same.

Referring to FIGS. 17 and 18, the net power consumed by the dump resistor 310 within the PDU 300 is calculated by each motor controller 110 as the net current multiplied by the local bus voltage. The net regenerative energy or current can be used to apply an RDC command directly at each motor controller 110 using the logic described above. In another embodiment, a central dump resistor temperature is estimated using the net current or power and the RDC command is modified based on the PDU 300 temperature using the logic described above.

In embodiments where multiple actuators 100 are connected to a single power supply 160, such as is illustrated in FIG. 28, the rate at which the RDC command increases can be based on the measured or approximated actuator 100 temperature or power. In this way, the motors that are operating at cooler temperatures can be used to dissipate more regenerative energy.

Actuator control system 1000, as illustrated in FIG. 18, includes all features of FIGS. 16-17, but further includes a central controller 500. There are numerous potential embodiments of the invention using central controller 500. In some embodiments, central controller 500 is configured to receive signals relative to vehicle performance characteristics, such as from one or more sensors of a base structure to which one or more of the actuators is attached. In one embodiment, central controller 500 sends force commands to the motor controller 110 within each actuator 100, and the motor controllers 100 send the RDC. In another embodiment, central controller 500 sends force commands and the RDC to the motor controller 110. In other embodiments, central controller 500 controls the communications networking between a plurality of motor controllers 110 for more than one actuator 100.

Central controller 500 is configured to receive signals from sensors such as, for example, vibration control sensors 520 and aircraft tachometer 540. In some embodiments, central controller 500 is configured to receive signals relative to vehicle performance characteristics, such as from one or more sensors of a base structure to which one or more of the actuators is attached. Central controller 500 is further configured to be connected to one or more of motor controllers 110 of the plurality of actuators 100A, 100B, and 100C. In another embodiment, the central controller 500 is further configured to contain one or more motor controllers 110 of the plurality of actuators 100A, 100B, and 100C. In the embodiment shown in FIG. 18, central controller 500 is connected to each motor controller 110 via data communications line 165. Data communications line 165 can be configured as either an analog or a digital communications bus and can be configured to enable uni- or bi-directional communication between central controller 500 and each of the motor controllers 110.

Referring to FIGS. 2A and 2B, actuators 100 used in active vibration control systems can use rotary or linear motor actuators. When paired with the actuator control system 1000, as illustrated in FIG. 18, the central controller 500 provides force commands to reduce vibrations at vibration control sensors 520.

In an embodiment, central controller 500 is configured to send commands to the motor controllers 110, including to instruct a specific motor controller 110 to issue a command to motor drive 120 to apply an RDC command to dissipate energy in motor windings 130. Central controller 500 may also be configured to receive information from each of motor controllers 110 concerning the occurrence of regeneration instances, motor windings 130 temperatures, and bus dump circuit 170 temperatures, and may further instruct an optimal actuator to dissipate the excess regenerative energy.

Referring back to FIG. 9, and in particular the upper graphical representation of FIG. 9, which illustrates the temperature of a central PDU dump resistor is predicted (estimated) or measured directly by a central controller 500, and the central controller 500 communicates the RDC command to the actuators based on the dump resistor temperature. In another embodiment, a central controller 500 schedules the RDC command based on a measured and/or predicted (estimated) current or power of the PDU.

Figure 19:
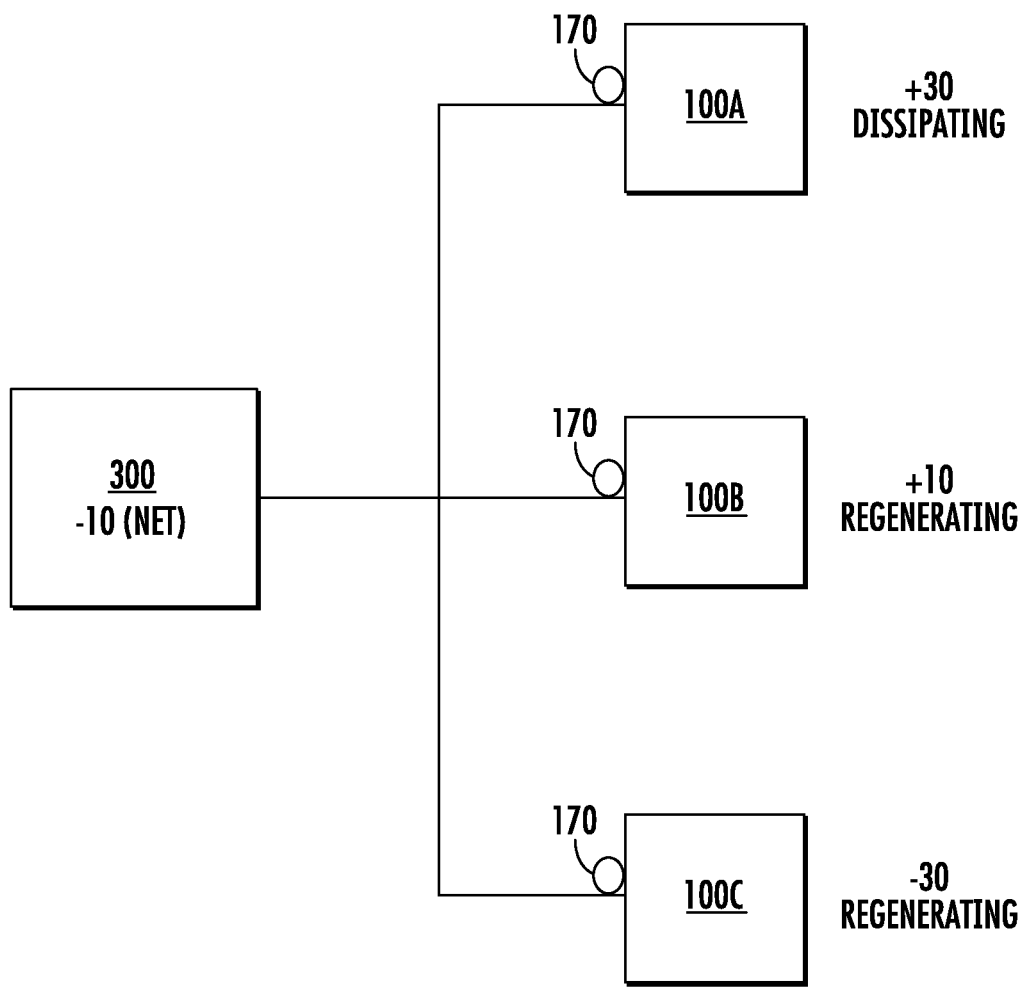
FIG. 19 is a schematic illustration of an exemplary control system with multiple actuators according to an embodiment of this invention illustrating the shared energy between a plurality of actuators with some actuators dissipating energy and some regenerating energy.

Referring to FIG. 19, a schematic representation of actuator control system 1000 as illustrated in FIGS. 16-18 in which a regeneration event is occurring. In FIG. 19 it can be seen that PDU 300 has a net regenerative energy of magnitude 10 Watts (W) which must be dissipated. The reason for this surplus regenerative energy is because, while actuator 100A is consuming 30 W, actuator 100B is regenerating 10 W and actuator 100C is regenerating 30 W, therefore creating an excess of 10 W in regenerative energy. It should be noted that each of actuators 100A, 100B, and 100C are equipped with the optional bus dump circuit 170. As such, according to the example regenerative energy dissipation scenario presented in FIG. 19, the excess regenerative energy of 10 W must be either dissipated in motor windings 130 or in one of bus dump circuits 170 in order to avoid the regenerative energy from back feeding to PDU 300.

Another inventive embodiment is to use field oriented voltage control (FOVC) to command the actuator to perform a desired function. The objective of FOVC is to use the classic field oriented control (FOC) methodology to maximize actuator 100 efficiency, but without the use of current sensor feedback (which can reduce size, weight, and cost of the controller). This is done by estimating the motor dynamics between voltage commands and current response.

Figure 10:
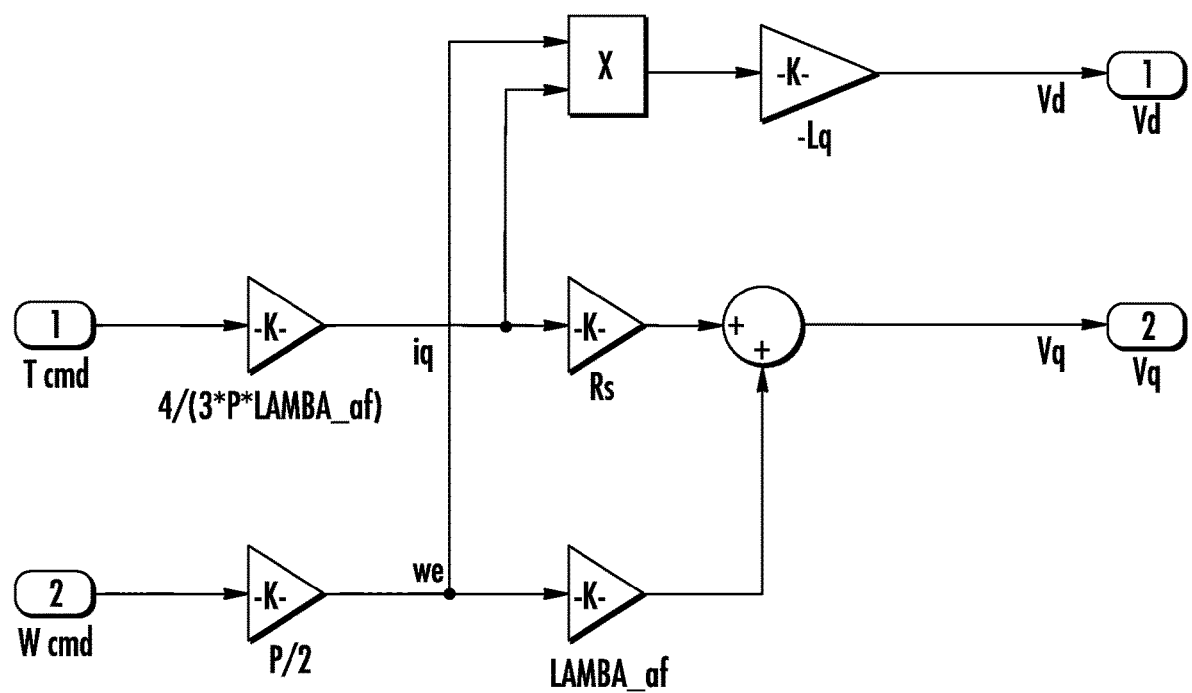
FIG. 10 illustrates a block diagram of an exemplary FOC voltage phasor estimator.

Referring now to the FOVC referenced above, a method of implementing FOVC in an actuator (e.g. 100) is disclosed herein. An exemplary algorithm for FOVC is illustrated in FIG. 10. Method of using the FOVC includes the steps of simplifying a 3-phase synchronous motor can be simplified to an equivalent 2-phase DC motor using the rotating rotor reference frame transformation. This can be seen in FIG. 6, where the stator windings are replaced with a fictitious stator winding on the q- and d-rotating axes.

The FOVC embodiments described herein are directed at surface mounted magnet PMSMs, where saliency is negligible and direct and quadrature inductances are very similar (Lq~Ld), therefore the electromagnetic torque ($T_e$) can be expressed as:

$$T_e = \frac{3}{2}\frac{P}{2}[\lambda_{af}]i_q \tag{8}$$

Using equation 8, for motors where saliency is negligible, only quadrature current produces torque. For other motors where saliency is not negligible, additional compensating terms will need to be added to the FOVC, which will not be described further herein.

A motor model can be expressed in terms of its rotor reference frame variables, yielding the following equation:

$$V_q = R_s i_q + L_q \frac{di_q}{dt} + \omega_e L_d i_d + \omega_e \lambda_{af} \tag{9}$$

$$V_d = R_s i_d + L_d \frac{di_d}{dt} - \omega_e L_q i_q \tag{10}$$

The methodology for estimating the voltage phasor is derived from the rotor reference motor equations above and by assuming that current will only be produced along the quadrature (e.g., "q") axis. Additionally, the transient inductive terms are neglected for this analysis, resulting in the following further simplified equations.

$$V_q = R_s i_q + \omega_e \lambda_{af} \tag{11}$$

$$V_d = \omega_e L_q i_q \tag{12}$$

Using the simplified expression for electromagnetic torque recited previously, the necessary torque-producing current ($i_q$) can be approximated as:

$$i_q = \frac{4T_e}{3P\lambda_{af}} \tag{13}$$

The electromagnetic torque is then replaced with the command torque ($T_{cmd}$), which is output from a rotor position/speed feedback control device. Additionally the electrical angular frequency ($\omega_e$) can be replaced with the commanded rotor speed multiplied by the number of pole pairs, as follows:

$$\omega_e = \omega(P/2) \tag{14}$$

Referring to FIG. 10, substituting in the above parameters into the simplified rotor reference motor voltage equations, one can estimate the optimal direct and quadrature voltages, $$V_q = R_s \frac{4T_{cmd}}{3P\lambda_{af}} + \frac{P\omega_{cmd}\lambda_{af}}{2} \tag{15}$$

$$V_d = -\omega_{cmd} L_q \frac{4T_{cmd}}{3P\lambda_{af}} \tag{16}$$

The voltage command must also be limited to the available bus voltage. This can be done by converting the dq voltages into a voltage phasor with the following magnitude ($V_s$) and angle ($\phi_e$), $$V_s = \sqrt{V_d^2 + V_q^2} \tag{17}$$

$$\phi_e = \alpha \tan 2(V_q, V_q) \tag{18}$$

Once the voltage phasor is saturated, it is converted back to the dq vector form as shown below, $$V_s^* = \min(V_{bus}, V_s) \tag{19}$$

$$V_d = V_s^* \cos(\phi_e) \tag{20}$$

$$V_q = V_s^* \sin(\delta_e) \tag{21}$$

The Clark transform, marked as equation (22) below, is then used to transform the dq voltage to 3-phase motor voltage waveforms.

$$\begin{bmatrix} S_a \\ S_b \\ S_c \end{bmatrix} = \begin{bmatrix} \cos(\theta_e) & \sin(\theta_e) & 1 \\ \cos(\theta_e - 2\pi/3) & \sin(\theta_e - 2\pi/3) & 1 \\ \cos(\theta_e + 2\pi/3) & \sin(\theta_e - 2\pi/3) & 1/2 \end{bmatrix} \begin{bmatrix} S_q \\ S_d \\ S_o \end{bmatrix} \tag{22}$$

Figure 11A:
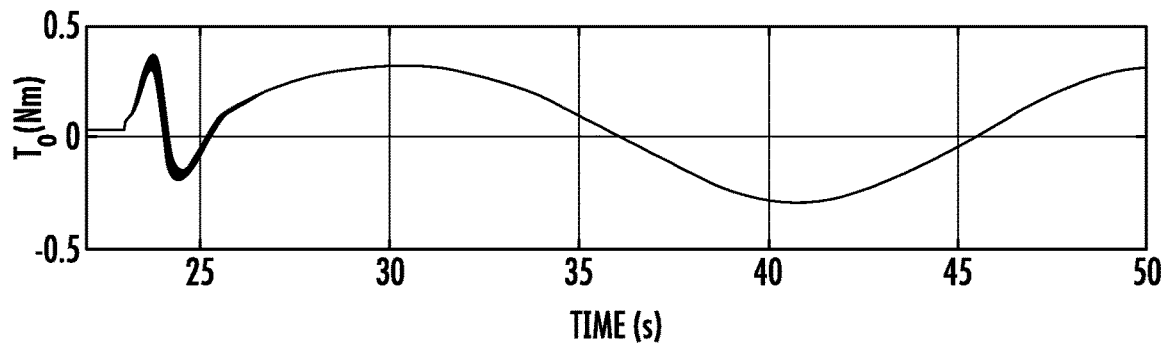
FIG. 11A is an exemplary plot of a torque demand over a period of time for a comparison between an example FOVC and a fixed angle controller (FAC).
Figure 11B:
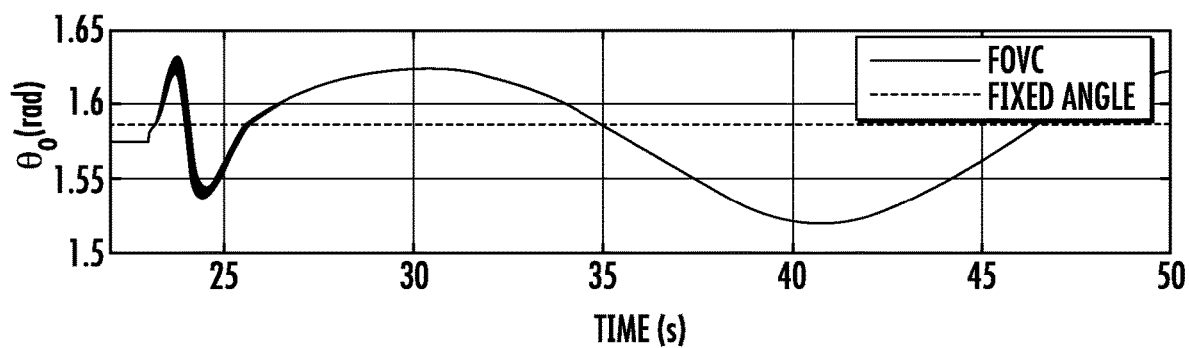
FIG. 11B is an exemplary plot of an electrical angle between the d-axis and the $V_s$ phasor over a period of time for the example torque demand plot shown in FIG. 1A, the electrical angle being shown for control by an FOVC and an FAC.
Figure 11C:
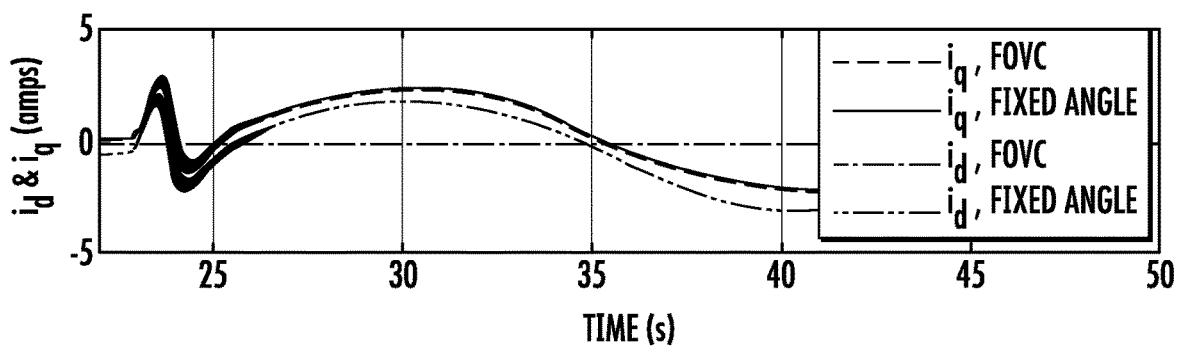
FIG. 11C is an exemplary plot of a direct and quadrature currents over a period of time for the example torque demand plot shown in FIG. 1A, the current values being shown for control by an FOVC and an FAC.

The example simulation plots illustrated in FIGS. 11A-C, show that as the torque demand varies, the optimal electrical angle shifts +/−0.05 radians. According to this example, the FOVC is able to track this optimal electrical angle and keep the flux current ($i_d$) very near zero, where the fixed electrical angle controller can expend significant power with flux current varying between +/−2 amps.

The method of controlling an actuator 100 using FOVC includes, for example: simplifying a 3-phase motor to an equivalent two phase motor; obtaining rotor position and/or speed from a rotor feedback control device of the actuator; estimating, from the rotor position and/or speed obtained, optimal direct and quadrature voltage values; and adjusting an RDC command commanded by motor controller 110 to increase an efficiency of a ratio of torque to power.

Figure 12:
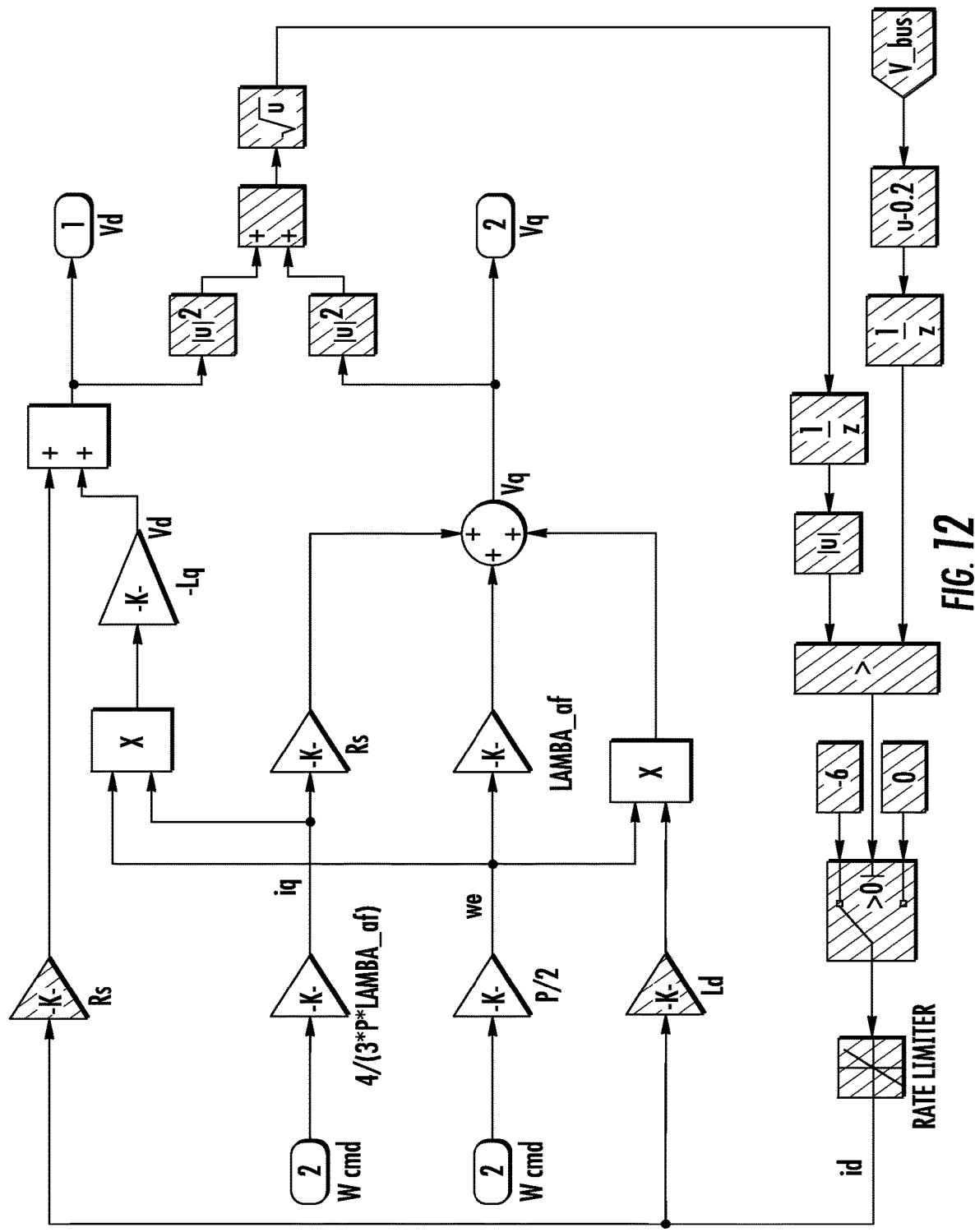
FIG. 12 illustrates an exemplary block diagram of the Field Oriented Voltage Controller with the Flux Weakening Voltage Control added

Referring now FIG. 12, a flux weakening voltage control (FWVC) method is illustrated. The method implements the FWVC in an actuator (e.g., 100). Referring now in greater detail to the FWVC control method, this method is used to directly control the amount flux weakening current ($i_d$) that is produced. FWVC is implemented in the motor controller 110 using the flux weakening methodology without current sensor feedback. Instead, this is done by monitoring a commanded voltage and bus voltage and applying observed $i_d$ through the use of an extended FOVC motor model, described hereinbelow.

During steady and normal transient operation, the rate of change terms ($L_q \, di_q/dt$ and $L_d \, di_d/dt$) are small enough compared to other terms to still be neglected but the $i_d$ terms are added back into the simplified motor model, $$V_q = R_s i_q + \omega_e L_d i_d + \omega_e \lambda_m \tag{23}$$

$$V_d = R_s i_d - \omega_e L_q i_q \tag{24}$$

Substituting the above dq voltage expression into equation (17) above results in the following equation:

$$|V_s| = \sqrt{(R_s i_d - \omega_e L_q i_q)^2 + (R_s i_q + \omega_e L_d i_d + \omega_e \lambda_m)^2} \tag{25}$$

Using the simplified expression for quadrature current ($i_q$), replacing the electromagnetic torque ($T_e$) with command torque ($T_{cmd}$) (e.g., output from rotor position/speed feedback control device), and replacing the electrical angular frequency ($\omega_e$) with the commanded rotor speed multiplied by the number of pole pairs [$\omega_e = \omega(P/2)$], the voltage phasor magnitude equation can be written as $$|V_s| = \sqrt{\left(R_s i_d - \omega_{cmd} L_q \frac{2T_{cmd}}{3\lambda_{af}}\right)^2 + \left(R_s \frac{4T_{cmd}}{3P\lambda_{af}} + \omega_e L_d i_d + \frac{P\omega_{cmd}\lambda_m}{2}\right)^2} \tag{26}$$

The direct current ($i_d$) can also be solved for as a function of electrical angle as shown below, $$i_d = \frac{V_d + \omega_e L_q i_q}{R_s} \tag{27}$$

Where $V_d$ is expressed in terms of $V_q$ and $\phi_e$, $$V_d = V_q \cot(\phi_e) \tag{28}$$

Substituting the expression used for $V_q$ and $i_q$ as done above and solving for $i_d$, the following expression for $i_d$ can be expressed as a function of $\phi_e$, $$i_d = \frac{\left[\left(R_s \frac{4T_{cmd}}{3P\lambda_{af}} + \frac{P\omega_{cmd}\lambda_m}{2}\right)\cot(\phi_e) + \frac{2\omega_{cmd}L_q T_{cmd}}{3\lambda_{af}}\right]}{R_s\left(1 - \frac{P\omega_{cmd}L_d}{2R_s}\right)} \tag{29}$$

Figure 13A:
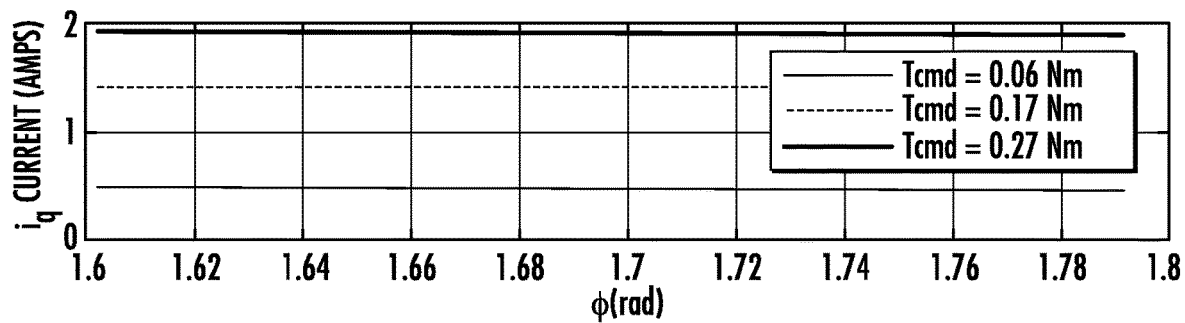
FIG. 13A is an exemplary plot of a quadrature current vs. an electrical angle for several example command torque values.
Figure 13B:
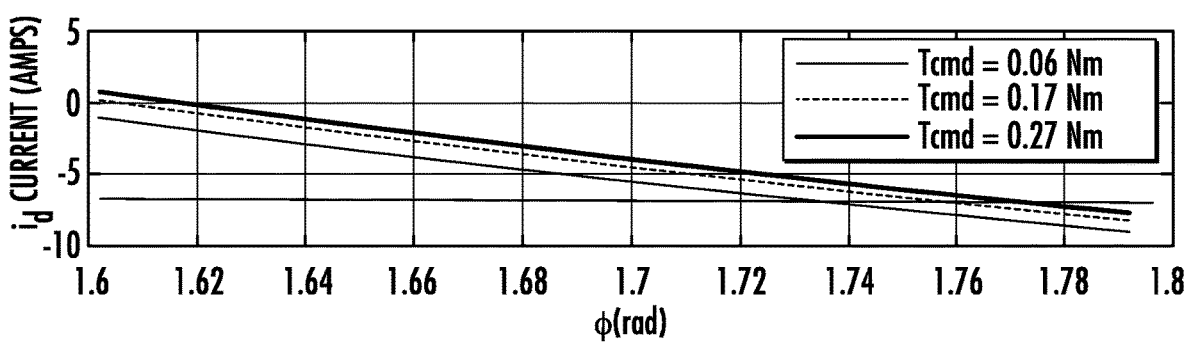
FIG. 13B is an exemplary plot of a direct current vs. electrical angle for several example command torque values.
Figure 13C:
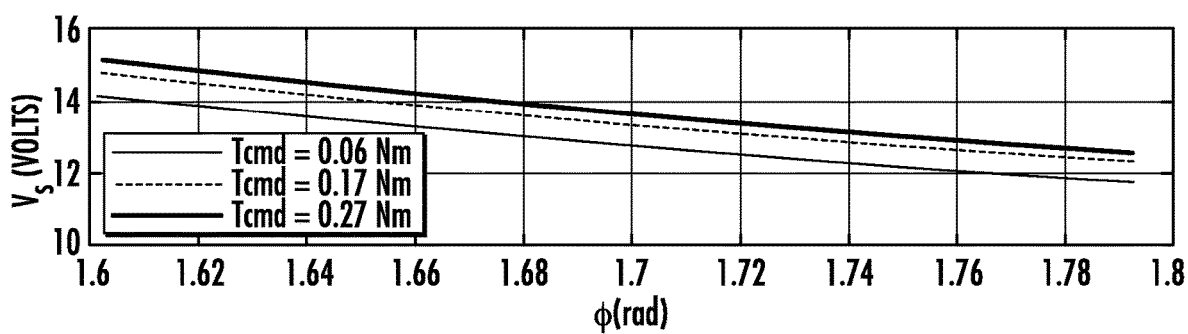
FIG. 13C is an exemplary plot of required voltage phasor magnitude vs. electrical offset angle.

Using the above expressions for $V_s$ and $i_d$, the relationship between the voltage phasor and electrical angle ($\phi_e$) is established. An example of this relationship is shown in FIG. 13A-13C for a few example torque values.

In the FWVC, the commanded voltage phasor magnitude is compared to the measured bus voltage (V_bus). If the voltage command magnitude is greater than the bus voltage, negative direct current is applied to reduce the mutual flux linkage, thereby reducing the effective back EMF.

This is depicted in the block diagram illustrated in FIG. 13, where the direct current is switched between two set points with an asymmetric slew rate (attach/release). If the bus voltage is found to be less than the commanded voltage magnitude, the direct current will slew to the negative set point at the 'attach' rate. Whenever the bus voltage goes above the voltage command magnitude, the negative direct current will release to the zero set point (typically at a slower rate than the attach rate). A hysteresis or dead zone can be applied to avoid any unwanted limit According to another embodiment, the FWVC control method can be implemented by direct calculation using equations 26 and 29. When using the direct calculation approach, a lookup table may be used to reduce the computational burden.

Figure 14A:
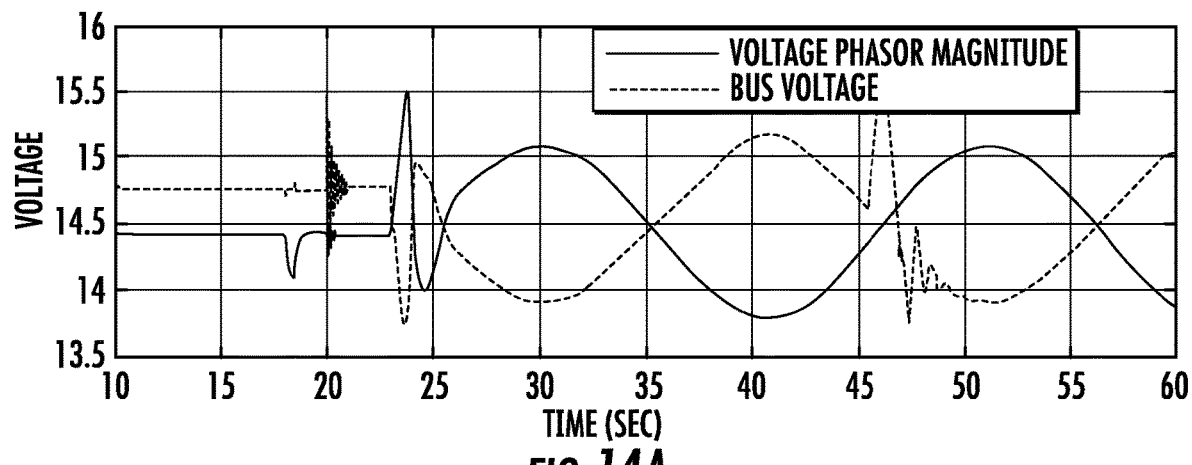
FIG. 14A is an exemplary plot of voltage vs. time, showing a comparison of the required voltage command magnitude and bus voltage with FWVC disabled.
Figure 14B:
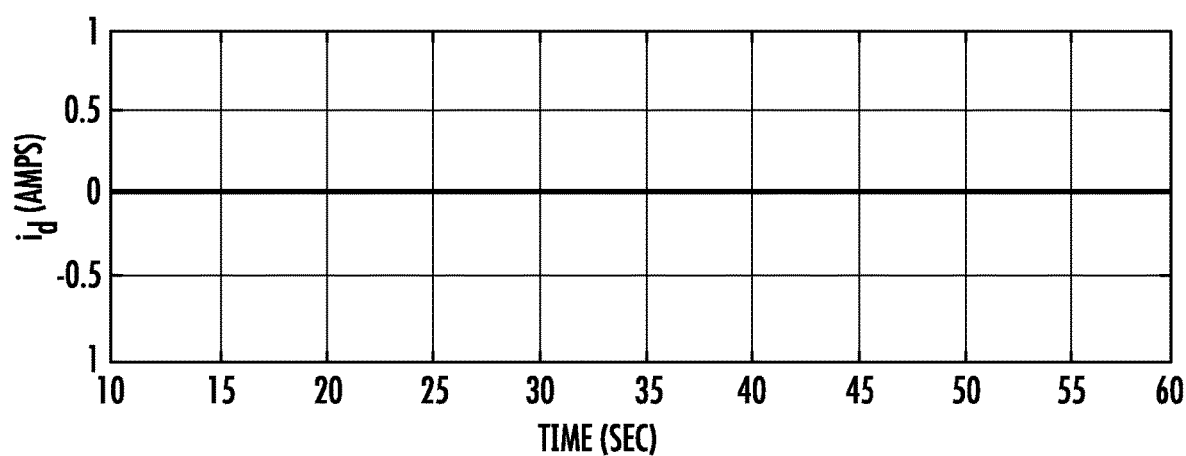
FIG. 14B is an exemplary plot of current vs. time, showing direct current injected with FWVC disabled.
Figure 15A:
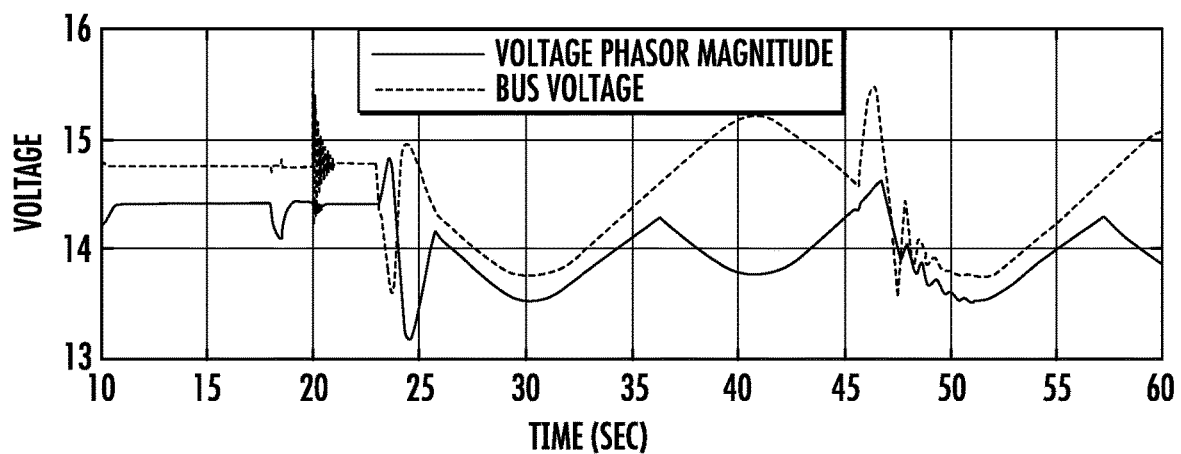
FIG. 15A is an exemplary plot of voltage vs. time, showing a comparison of the required voltage command magnitude and bus voltage with FWVC enabled.
Figure 15B:
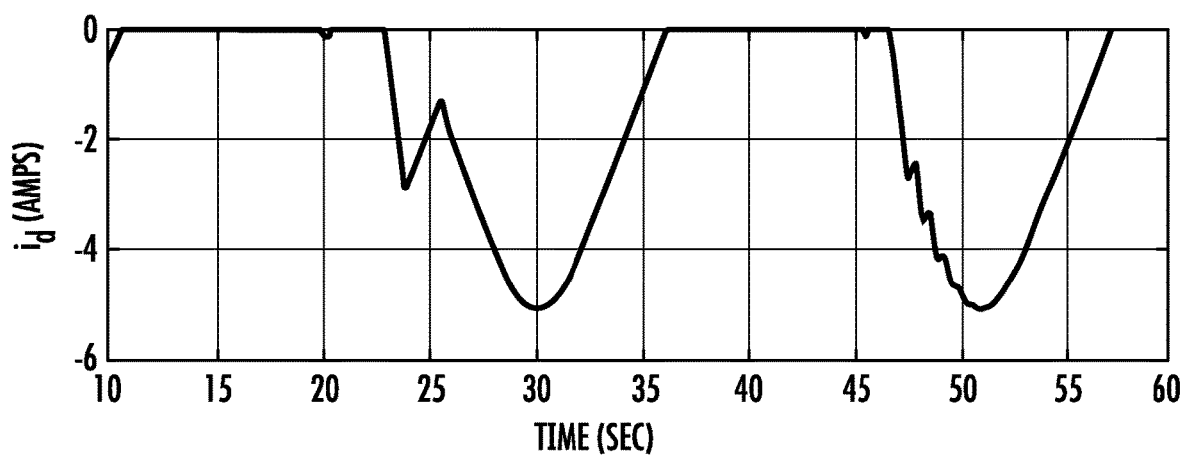
FIG. 15B is an exemplary plot of current vs. time, showing direct current injected with FWVC enabled.

FIGS. 14A-B and 15A-B illustrate a simulation with a time varying torque disturbance. Referring first to FIGS. 14A and 14B, the voltage plot shown in FIG. 14A shows how the voltage phasor and bus voltage respond to the torque disturbances. The current plot of FIG. 14B shows the direct current ($i_d$). For the plots shown in FIGS. 14A-B, FWVC was disabled and $i_d$ remained at zero throughout. With FWVC disabled, it can be seen in FIG. 14A that there are several extended durations where the bus voltage dropped significantly below the required voltage command magnitude. During such an under-voltage condition, the motor controller would be unable to drive the proper current and maintain control of the motors. FIGS. 15A-B, however, show a second simulation with the same torque disturbance condition shown in FIGS. 14A-B, but with FWVC turned on. With FWVC enabled, it can be seen in FIGS. 15A-B that the flux has been weakened from the $i_d$ current injected and, therefore, the required voltage command magnitude is now maintained below the bus voltage except for a few short transient events, as is shown in FIG. 15A.

Referring now FIG. 12, a flux weakening voltage control (FWVC) method is illustrated. The method implements the FWVC in an actuator (e.g., 100). The FWVC method includes the steps of simplifying a three phase motor to an equivalent two phase motor, monitoring a voltage phasor magnitude commanded by a motor controller and a measured bus voltage, comparing the voltage phasor magnitude commanded to the measured bus voltage, and applying, when the voltage phasor magnitude commanded is greater than the measured bus voltage, a negative direct current to reduce a mutual flux linkage.

Referring now in greater detail to the FWVC control method, this method is used to directly control the amount flux weakening current ($i_d$) that is produced. The FWVC is implemented in the motor controller using the flux weakening methodology without current sensor feedback. Instead this is done by monitoring a commanded voltage and bus voltage and applying observed $i_d$ through the use of an extended FOVC motor model, described hereinbelow.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. An actuator comprising:
   a motor controller;
   a motor drive configured to receive power from a power source and to receive a command from the motor controller;
   at least one motor winding configured to receive a voltage from the motor drive;
   at least one or more sensors configured to detect a parameter associated with the actuator and communicate at least one signal containing information about the detected parameter to the motor controller; and
   a bus dump circuit configured to dissipate regenerative energy;
   wherein the motor controller is configured to process the at least one signal from the one or more sensors and provide control of the actuator; and
   wherein the actuator is configured to apply an RDC command to the command from the motor controller, wherein the RDC command is configured to be adjusted using a temperature of a resistor in the bus dump circuit.

2. The actuator of claim 1, further comprising a diode or rectifier configured to prevent regenerative energy from returning to the power source.

3. The actuator of claim 1, where regenerative energy is dissipated in the motor windings or the bus dump circuit.

4. The actuator of claim 1, wherein the actuator is a rotary motor actuator or a linear motor actuator.

5. The actuator of claim 1, wherein the one or more sensors comprise one or more of a Hall effect sensor, an encoder or resolver configured to measure phase position and speed, a motor temperature sensors, a motor voltage sensor, a motor current sensor, a bus voltage sensor, a bus current sensor, and a bus dump resistor sensor, and combinations thereof.

6. The actuator of claim 1, wherein the RDC command is random, DC, or a sine wave.

7. The actuator of claim 1, wherein the actuator is configured to measure or estimate a temperature of the bus dump circuit and the RDC command is adjusted using the temperature of the bus dump circuit.

8. The actuator of claim 7, wherein the RDC command applied is proportional to the temperature of the bus dump circuit.

9. The actuator of claim 1, wherein the RDC command is a static value.

10. A system comprising a power bus connecting a plurality of actuators of claim 1 to the power source.

11. The system of claim 10, further comprising a rectifier and/or diode configured to prevent regenerative energy from returning to the power source.

12. The system of claim 10 wherein regenerative energy can be dissipated in any or all of the motor windings of any or all of the plurality of actuators and/or in at least one resistor of the bus dump circuit of any or all of the plurality of actuators.

13. The system of claim 10, wherein the power bus is configured to redistribute regenerative energy among the plurality of actuators.

14. The system of claim 10, wherein the RDC command selected in each actuator is based on a respective bus dump circuit temperature.

15. The system of claim 10, wherein a relationship between the RDC command and the temperature of the respective bus dump circuit in each actuator is proportional.

16. The system of claim 10, wherein RDC command applied to the command of the motor controller is a static value.

17. The system of claim 10, comprising a power distribution unit (PDU) with a PDU dump resistor.

18. The system of claim 17, further comprising a capacitor bank.

19. The system of claim 17, further comprising a central controller configured to receive signals from one or more sensors of the actuators and to control one or more of the actuators.

20. The system of claim 19, wherein the central controller is configured to control a dissipation of regenerative energy in any or all of the motor windings of the plurality of actuators, in at least one resistor of at least one bus dump circuit of the plurality of actuators, and/or the PDU dump resistor.

21. The system of claim 17, wherein each actuator is configured to apply the RDC command to the command from the motor controller for one or more of the plurality of actuators, and wherein the RDC command selected in each actuator is based on a temperature of one or more of a respective one of the bus dump circuits and/or the PDU dump resistor.

22. The system of claim 21, wherein a relationship between the RDC command and a temperature of the respective bus dump circuit(s) and/or the PDU dump resistor in each actuator is proportional.

23. The system of claim 10, comprising a central controller configured to receive one or more sensor signals and to send one or more actuator commands to the motor controllers of the plurality of actuators.

24. The system of claim 10, wherein each of the plurality of actuators is configured to apply an RDC command to the command from the motor controller for one or more of the plurality of actuators, and wherein the RDC command is configured to be adjusted using a temperature of a resistor in one or more of the bus dump circuits in the plurality of actuators.

25. The system of claim 10, wherein the motor controller of each of the plurality of actuators is configured to share data with all other motor controllers.

26. The system of claim 17, wherein the PDU further comprises a voltage rectification unit.

27. The system of claim 26, wherein the voltage rectification unit of the PDU is in electrical communication with the power source.

28. The system of claim 17, wherein regenerative energy can be dissipated in any or all of the motor windings of any or all of the plurality of actuators, in at least one resistor of the bus dump circuits of any or all of the plurality of actuators, and/or in the PDU dump resistor.

29. A method of controlling regenerative energy, the method comprising:
   providing at least one actuator comprising:
      a motor controller;
      a motor drive configured to receive power from a power source and to receive a command from the motor controller;
      at least one motor winding configured to receive a voltage from the motor drive;
      at least one or more sensors configured to detect a parameter associated with the actuator and communicate at least one signal containing information about the detected parameter to the motor controller; and
      a bus dump circuit configured to dissipate regenerative energy;
      wherein the motor controller is configured to process the at least one signal from the one or more sensors and provide control of the actuator;
   detecting a regenerative condition;
   applying an RDC command to the command;
   adjusting the RDC command using a temperature of a resistor in the bus dump circuit; and
   dissipating the regenerative energy in the motor windings and/or a bus dump circuit.

30. The method of claim 29, wherein dissipating the regenerative energy in the motor windings comprises:
   sending a command from the motor controller to the motor drive, and
   applying, using the motor drive, the RDC command.

31. The method of claim 30, wherein the RDC command is a static value.

32. The method of claim 30, wherein the RDC command is applied using a measured current and/or power.

33. The method of claim 30, wherein the RDC command is applied using a measured or estimated net current and/or power value from a power distribution unit (PDU).

34. The method of claim 29, wherein the at least one actuator is a plurality of actuators and wherein a dump resistor is located within a common power distribution unit (PDU).

35. The method of claim 34 wherein the RDC command applied is proportional to a temperature of the regenerative dump resistor.

36. The method of claim 29, wherein the motor drive is a synchronous or an electro dynamic motor.

* * * * *